US011810393B2

(12) United States Patent
Lee et al.

(10) Patent No.: US 11,810,393 B2
(45) Date of Patent: Nov. 7, 2023

(54) FINGERPRINT AUTHENTICATION DEVICE, DISPLAY DEVICE INCLUDING THE SAME, AND METHOD OF AUTHENTICATING FINGERPRINT OF DISPLAY DEVICE

(71) Applicant: SAMSUNG DISPLAY CO., LTD., Yongin-si (KR)

(72) Inventors: Soon Gyu Lee, Yongin-si (KR); Jin A Kang, Yongin-si (KR); Jin Woo Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/341,633

(22) Filed: Jun. 8, 2021

(65) Prior Publication Data

US 2022/0067331 A1 Mar. 3, 2022

(30) Foreign Application Priority Data

Sep. 1, 2020 (KR) ........................ 10-2020-0111331

(51) Int. Cl.
  *G06V 40/12* (2022.01)
  *G06N 20/00* (2019.01)
  (Continued)

(52) U.S. Cl.
  CPC ...... *G06V 40/1359* (2022.01); *G06F 18/2163* (2023.01); *G06N 5/04* (2013.01);
  (Continued)

(58) Field of Classification Search
  CPC .... G06V 40/1359; G06V 10/25; G06V 10/30; G06V 10/993; G06V 40/1376;
  (Continued)

(56) References Cited

U.S. PATENT DOCUMENTS 9,990,532 B2   6/2018  Lee et al.
2016/0180141 A1*  6/2016  Sarve ................. G06V 40/1359
                                          382/124

(Continued)

FOREIGN PATENT DOCUMENTS

KR    10-0698723    3/2007
KR    10-1632912    6/2016
(Continued)

OTHER PUBLICATIONS

Liu, Fingerprint Analysis and Singular Point Definition by Deep Neural Network, International Journal of Machine Learning and Computing, vol. 8, No. 6, Dec. 2018 (Year: 2018).*

(Continued)

*Primary Examiner* — Abhishek Sarma
(74) *Attorney, Agent, or Firm* — F. Chau & Associates, LLC

(57) ABSTRACT

A fingerprint authentication device includes a biometric sensor configured to generate a sensing signal by sensing biometric information, an image processor configured to generate a fingerprint image based on the sensing signal, a singular point determiner circuit configured to select at least one fingerprint piece based on the fingerprint image or the sensing signal, and determine a singular point of the fingerprint image by analyzing the selected at least one fingerprint piece, and an authenticator circuit. The image processor is further configured to extract an interest region including the singular point from the fingerprint image based on a coordinate of the singular point, and the authenticator circuit is configured to perform fingerprint authentication by comparing the interest region with registered fingerprint information.

22 Claims, 17 Drawing Sheets

(51) Int. Cl.
  *G06V 10/25* (2022.01)
  *G06V 10/30* (2022.01)
  *G06V 10/98* (2022.01)
  *G06N 5/04* (2023.01)
  *G06F 18/21* (2023.01)

(52) U.S. Cl.
  CPC ............ *G06N 20/00* (2019.01); *G06V 10/25* (2022.01); *G06V 10/30* (2022.01); *G06V 10/993* (2022.01); *G06V 40/1376* (2022.01)

(58) Field of Classification Search
  CPC ............ G06V 40/1347; G06V 40/1365; G06F 18/2163; G06F 21/32; G06N 5/04; G06N 20/00; G06T 5/002; G06T 2207/20081
  See application file for complete search history.

(56) References Cited

U.S. PATENT DOCUMENTS

| | | |
|---|---|---|
| 2018/0165508 A1 | 6/2018 | Othman et al. |
| 2019/0205596 A1 | 7/2019 | Kim et al. |
| 2021/0334495 A1 | 10/2021 | Lee et al. |

FOREIGN PATENT DOCUMENTS

| | | |
|---|---|---|
| KR | 10-1778552 | 9/2017 |
| KR | 10-1985658 | 6/2019 |
| KR | 1020190081292 | 7/2019 |
| KR | 10-2021-0131513 | 11/2021 |

OTHER PUBLICATIONS

Kunal Goyal et al: "SIFT based fingerprint corepoint localization", Biometrics Special Interest Group (BIOSIG), 2012 BIOSIG—Proceedings of the International Conference of the, IEEE, Sep. 6, 2012, pp. 1-12, XP032243140, ISBN: 978-1-4673-1010-9.

Qin Jin et al, "Multi-scaling Detection of Singular Points Based on FUlly Convolutional Networks in Fingerprint Images", Oct. 20, 2017, Sat 2015 18th Int. Conference, Austin, TX, USA, Sep. 24-27, 2015; [Lecture Notes in Computer Science; Lect.Notes Computer], Springer, pp. 221-230, XP047451334.

Khan Asif Iqbal, "Lafin: A Conolutional Neural Network-based Technique for Singular Point Extraction and Classification of Latent Fingerprints", 2018 Int Conference on Soft-Computing and Network Security (ICSNS), IEEE, Feb. 14, 2018, pp. 1-7, XP033471182.

Liu Jin et al, "Fingerprint image quality assessment based on BP neural network with hierarchical clustering", IET Information Security, The Institution of Engineering and Technology, vol. 14, No. 2, Mar. 1, 2020, pp. 185-195, XP006088936; and.

Zhu En et al, "Walking to singular points of fingerprints", Pattern Recognition, Elsevier, vol. 56, Mar. 4, 2016, pp. 116-128, XP029500045.

* cited by examiner

FINGERPRINT AUTHENTICATION DEVICE, DISPLAY DEVICE INCLUDING THE SAME, AND METHOD OF AUTHENTICATING FINGERPRINT OF DISPLAY DEVICE

CROSS-REFERENCE TO RELATED APPLICATIONS

This application claims priority under 35 U.S.C. § 119(a) to Korean Patent Application No. 10-2020-0111331, filed on Sep. 1, 2020 in the Korean Intellectual Property Office, the disclosure of which is incorporated by reference herein in its entirety.

TECHNICAL FIELD

Embodiments of the present disclosure generally relate to a fingerprint authentication device, a display device including the same, and a method of authenticating a fingerprint of a display device.

DISCUSSION OF RELATED ART

As the use of electronic devices such as smartphones and wearable devices becomes more ubiquitous, security for information stored in such electronic devices has become more important. In response to such security needs, authentication techniques based on biometric information of a user have been developed.

Authentication techniques based on biometric information may acquire biometric information such as, for example, a fingerprint, an iris, a voice, a face, a blood vessel, etc. from a user, and compare the acquired biometric information with previously registered biometric information to authenticate the user. Among authentication techniques based on biometric information, a fingerprint recognition technique is one of commercially available techniques for various reasons such as, for example, convenience, security, and cost. The fingerprint recognition technique may enhance security for user devices and provide security for various application services such as, for example, mobile payment. The fingerprint recognition technique may be utilized in electronic devices including a fingerprint sensor that senses a fingerprint of a user.

SUMMARY

Embodiments of the present disclosure provide a fingerprint authentication device for performing fingerprint authentication by extracting an interest region including a singular point of a fingerprint image, a method of authenticating a fingerprint, and a display device.

According to an embodiment of the present disclosure, a fingerprint authentication device includes a biometric sensor configured to generate a sensing signal by sensing biometric information, an image processor configured to generate a fingerprint image based on the sensing signal, a singular point determiner circuit configured to select at least one fingerprint piece based on the fingerprint image or the sensing signal, and determine a singular point of the fingerprint image by analyzing the selected at least one fingerprint piece, and an authenticator circuit. The image processor is further configured to extract an interest region including the singular point from the fingerprint image based on a coordinate of the singular point, and the authenticator circuit is configured to perform fingerprint authentication by comparing the interest region with registered fingerprint information.

In an embodiment, the singular point determiner circuit is configured to determine the singular point through machine learning using a detection model set by the singular point determiner circuit.

In an embodiment, the singular point determiner circuit is configured to divide the fingerprint image into k (k is an integer greater than 1) sampling regions, and select fingerprint pieces corresponding to an arbitrary position of each of the k sampling regions.

In an embodiment, the singular point determiner circuit is configured to acquire the singular point by applying, to the detection model, ridges and valleys, which are derived from each of the fingerprint pieces.

In an embodiment, the singular point determiner circuit is configured to set the detection model based on model fingerprint images used for machine learning, and the model fingerprint images are provided from outside of the fingerprint authentication device.

In an embodiment, the singular point determiner circuit is configured to update the detection model through additional machine learning using the fingerprint image generated by the image processor, the at least one fingerprint piece of the fingerprint image, and the interest region.

In an embodiment, the image processor includes a first data processor configured to convert the sensing signal into a first fingerprint image in a digital form, which corresponds to the fingerprint image, a second data processor configured to detect a noise region influenced by noise caused by an external environment in the first fingerprint image, and generate a second fingerprint image by blurring the noise region, an image cropper circuit configured to determine the interest region having a predetermined size, which includes the singular point, in the second fingerprint image, and discard a remaining portion of the second fingerprint image other than the interest region, and a storage configured to store information of the interest region.

In an embodiment, the image cropper circuit is configured to determine the coordinate of the singular point as a center coordinate of the interest region.

In an embodiment, the image cropper circuit is configured to shift a center coordinate of the interest region such that the interest region becomes more distant from the noise region.

In an embodiment, the center coordinate is located more distant from the noise region than the coordinate of the singular point.

In an embodiment, the second data processor is configured to digitize the noise, and generate a fingerprint sensing retry command when the noise is equal to at least a predetermined threshold reference value.

In an embodiment, the noise region is a portion of the first fingerprint image having a luminance greater than a predetermined luminance tolerance.

In an embodiment, the noise region includes at least one of a portion at which a wrinkle except a fingerprint is expressed, a portion which is relatively dry, and a portion overlapping a foreign matter.

In an embodiment, an area of a sensing region of the biometric sensor is greater than an area of the interest region.

In an embodiment, the area of the interest region is equal to or less than about 30% of the sensing region.

In an embodiment, the singular point includes at least one of a core and a delta of a fingerprint.

According to an embodiment of the present disclosure, a method of authenticating a fingerprint of a display device includes generating a fingerprint image of a fingerprint sensed through a biometric sensor, determining a singular point of the fingerprint image through machine learning by selecting a plurality of fingerprint pieces from the fingerprint image, extracting an interest region including the singular point from the fingerprint image, and authenticating a fingerprint by comparing the interest region with registered fingerprint information.

In an embodiment, determining the singular point includes setting a preliminary detection model for detecting the singular point through machine learning based on a model fingerprint image used for machine learning, which is provided from outside of the display device, selecting the fingerprint pieces from an arbitrary position of the model fingerprint image used for machine learning, and restoring the model fingerprint image used for machine learning by using the fingerprint pieces and the preliminary detection model, updating the preliminary detection model as a detection model by machine-learning the restored model fingerprint image used for machine learning, and calculating the singular point from a real-time fingerprint image by using the detection model.

In an embodiment, determining the singular point further includes updating the detection model by machine-learning the real-time fingerprint image and the singular point of the real-time fingerprint image.

In an embodiment, generating the fingerprint image includes determining a noise region by analyzing data of the fingerprint image, and generating a corrected fingerprint image by blurring the noise region. Extracting the interest region includes determining the interest region including the singular point in the corrected fingerprint image, and discarding a remaining portion outside of the interest region.

In an embodiment, determining the interest region includes comparing positions of the interest region and the noise region, determining a coordinate of the singular point as a center coordinate of the interest region when the interest region and the noise region do not overlap each other, and shifting the center coordinate of the interest region such that the interest region becomes more distant from the noise region when at least a portion of the interest region overlaps the noise region.

In an embodiment, generating the fingerprint image further includes comparing positions of the fingerprint pieces and the noise region, and outputting a command for re-selecting the fingerprint pieces when at least one of the fingerprint pieces is included in the noise region.

According to an embodiment of the present disclosure, a display device includes a display panel including a plurality of pixels, and a fingerprint authentication device configured to sense a fingerprint input via the display panel. The fingerprint authentication device includes a biometric sensor disposed on one surface of the display panel and configured to generate a sensing signal by sensing the fingerprint, an image processor configured to generate a fingerprint image based on the sensing signal, a singular point determiner circuit configured to select a plurality of fingerprint pieces from the fingerprint image, and determine a singular point of the fingerprint image by analyzing the selected fingerprint pieces, and an authenticator circuit. The image processor is further configured to extract an interest region including the singular point from the fingerprint image based on a coordinate of the singular point, and the authenticator circuit is configured to perform fingerprint authentication by comparing the interest region with registered fingerprint information.

In the fingerprint authentication device, the display device including the same, and the method of authenticating a fingerprint thereof in accordance with an embodiment of the present disclosure, an interest region having a small area, which includes a large number of minutiae, may be rapidly extracted by using an artificial intelligence (AI) technique operated in parallel to the existing image processing. Accordingly, the reliability of authentication on biometric information sensed through a large-area fingerprint sensing region, and a processing speed for authentication, can be increased.

In the fingerprint authentication device having a fingerprint sensing region with a small area, the display device including the same, and the method of authenticating a fingerprint of the display device in accordance with an embodiment of the present disclosure, image processing such as, for example, blurring, is performed on a noise region, and whether a fingerprint is to be re-input is determined based on the noise region. Thus, distortion of a detected fingerprint due to noise and an authentication error may be reduced, and a calculation processing time and an authentication time may be reduced.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1:
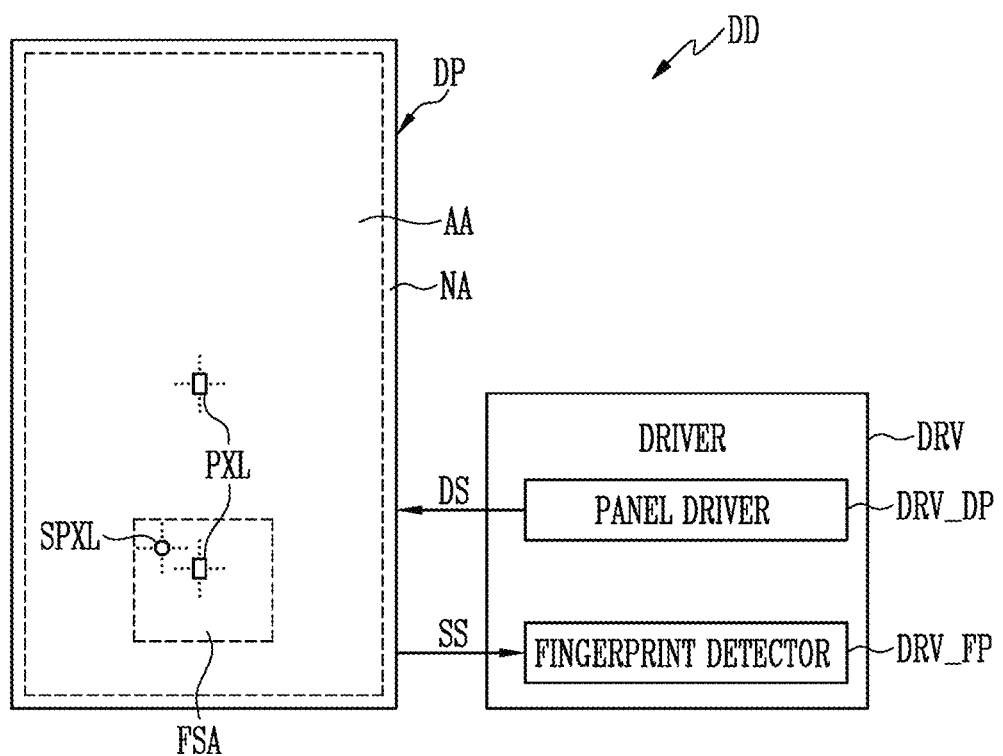
FIG. 1 is a block diagram illustrating a display device in accordance with embodiments of the present disclosure.

Embodiments of the present disclosure will be described more fully hereinafter with reference to the accompanying drawings. Like reference numerals may refer to like elements throughout the accompanying drawings.

The terms "first," "second," "third," etc. are used herein to distinguish one element from another, and the elements are not limited by these terms. Thus, a "first" element in an embodiment may be described as a "second" element in another embodiment.

Descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

When an element is referred to as being "on", "connected to", "coupled to", or "adjacent to" another element, it can be directly on, connected, coupled, or adjacent to the other element, or intervening elements may be present. It will also be understood that when an element is referred to as being "between" two elements, it can be the only element between the two elements, or one or more intervening elements may also be present. Other words used to describe the relationships between elements should be interpreted in a like fashion.

When two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

When two or more processes or events are described as being performed in parallel, or as being performed at or occurring at substantially the same time, it is to be understood that the processes or events may be performed at or may occur at exactly the same time, or at about the same time as would be understood by a person having ordinary skill in the art. For example, the processes or events may be performed at or may occur at about the same time within a measurement error as would be understood by a person having ordinary skill in the art.

Other uses of the terms "about" and "substantially" should be interpreted in a like fashion.

FIG. 1 is a block diagram illustrating a display device in accordance with embodiments of the present disclosure.

For convenience of explanation, although a case in which a display panel DP and a driver DRV are separated from each other is illustrated in FIG. 1, the present disclosure is not limited thereto. For example, in embodiments, the whole or a portion of the driver DRV may be integrally implemented with the display panel DP on the display panel DP.

Referring to FIG. 1, the display device DD may include the display panel DP and the driver DRY. The driver DRV may include a panel driver DRV_DP and a fingerprint detector DRV_FP (or fingerprint authenticator).

The whole or at least a portion of the display device DD may have flexibility. For example, the whole or at least a portion of the display device DD may be bendable, foldable, rollable, etc.

The display panel DP includes a display region AA and a non-display region NA. The display region AA is a region in which a plurality of pixels PXL (also referred to as a plurality of sub-pixels) is provided, and may also be referred to as an active region. Each of the pixels PXL may include at least one light emitting device. The display device DD drives the pixels PXL based on image data input from outside the display device DD, thereby displaying an image in the display region AA.

The display region AA may include a sensing region (or fingerprint sensing region) FSA. The fingerprint sensing region FSA may overlap at least some pixels PXL among the pixels PXL provided in the display region AA. In an embodiment, as shown in FIG. 1, at least a portion of the display region AA may be set as the fingerprint sensing region FSA.

Although an example in which only one fingerprint sensing region FSA is formed in the display region AA is illustrated in FIG. 1, the present disclosure is not limited thereto. For example, in embodiments, a plurality of fingerprint sensing regions FSA arranged regularly or irregularly may be formed in the display region AA.

The non-display region NA is a region disposed at the periphery of the display region AA, and may also be referred to as a non-active region. For example, the non-display region NA may include a line region, a pad region, various dummy regions, etc.

In an embodiment, the display device DD may further include a plurality of sensor pixels SPXL provided in the fingerprint sensing region FSA.

In an embodiment, each of the sensor pixels SPXL may be configured as a photo sensor for sensing light. When light emitted from a light source (or pixel PXL) provided in the display device DD is reflected by a finger of a user, each of the sensor pixels SPXL may sense the reflected light and output a corresponding electrical signal (e.g., a voltage signal). The electrical signal of each of the sensor pixels SPXL may constitute one point in a fingerprint image (e.g., a point of light and shade or a pixel as a minimum unit constituting the fingerprint image). Reflected lights incident into the respective sensor pixels SPXL may have different optical characteristics (e.g., frequencies, wavelengths, sizes, etc.) according to whether the reflected lights are caused by valleys or ridges of a fingerprint (or a palm pattern or a skin pattern) formed on the finger (or a palm or skin) of the user. Therefore, the sensor pixels SPXL may output a sensing signal SS having different electrical characteristics corresponding to the optical characteristics of the reflected lights.

When the sensor pixels SPXL are arranged in the fingerprint sensing region FSA, the sensor pixels SPXL may overlap the pixels PXL or be disposed at the periphery of the pixels PXL. For example, some or all of the sensor pixels SPXL may overlap the pixels PXL or be disposed between the pixels PXL. In embodiments, the sensor pixels SPXL and the pixels PXL may have the same size or different sizes. The relative size and arrangement between the sensor pixels SPXL and the pixels PXL are not particularly limited.

When the sensor pixels SPXL are disposed adjacent to the pixels PXL or at least partially overlap the pixels PXL, the sensor pixels SPXL may use, as a light source, the light emitting device provided in each pixel PXL. Therefore, the sensor pixels SPXL along with the light emitting devices provided in the pixels PXL may constitute a photosensitive type fingerprint sensor. As described above, when a display device having a built-in fingerprint sensor is configured by using the pixels PXL as a light source, without the need for utilizing any additional external light source, the thickness of the photosensitive type fingerprint sensor and the display device having the same may be decreased, and the manufacturing cost may be reduced.

In an embodiment, the sensor pixels SPXL may constitute an ultrasonic sensor for sensing ultrasonic waves. The sensor pixels SPXL may emit an ultrasonic signal, and output corresponding electrical signals (or a sensing signal SS) by sensing an ultrasonic wave reflected by the finger of the user.

In an embodiment, the sensor pixels SPXL may constitute a capacitive sensor of which capacitance is changed depending on the shape of a fingerprint.

In embodiments, the sensor pixels SPXL may be arranged on the other surface (e.g., a rear surface) of the display panel DP facing a surface (e.g., a front surface) of the display panel DP on which an image is displayed. However, the present disclosure is not limited thereto. For example, in embodiments, the sensor pixels SPXL may be disposed more adjacent to the front surface of the display panel DP than the pixels PXL.

The driver DRV may drive the display panel DP. For example, the driver DRV may output a data signal DS corresponding to image data to the display panel DP. Also, the driver DRV may output a driving signal for the sensor pixels SPXL, and receive electrical signals (e.g., a sensing signal SS) received from the sensor pixels SPXL. The driver DRV may detect a fingerprint shape of a user by using the electrical signals.

In embodiments, the driver DRV may include the panel driver DRV_DP and the fingerprint detector DRV_FP. Each of the panel driver DRV_DP and the fingerprint detector DRV_FP may be implemented as an integrated circuit, and may be mounted on a flexible circuit board. The panel driver DRV_PD may be connected to the display panel DP through the flexible circuit board, and the fingerprint detector DRV_FP may be connected to the sensor pixels SPXL. Although a case in which the panel driver DRV_DP and the fingerprint detector DRV_FP are separated from each other is illustrated in FIG. 1, the present disclosure is not limited thereto. For example, in embodiments, at least a portion of the fingerprint detector DRV_FP may be integrated together with the panel driver DRV_PD, or operate in connection with the panel driver DRV_DP.

The panel driver DRV_DP may supply a data signal DS corresponding to image data to the pixels PXL while sequentially scanning the pixels PXL of the display region AA. Then, the display panel DP may display an image corresponding to the image data.

The fingerprint detector DRV_FP may detect or recognize a fingerprint, based on a sensing signal SS provided from the sensor pixels SPXL. For example, the fingerprint detector DRV_FP may convert the sensing signal SS into a fingerprint image (or fingerprint image data), and perform fingerprint authentication, based on the fingerprint image. The sensor pixels SPXL and the fingerprint detector DRV_FP may constitute a fingerprint authentication device FDD (or fingerprint sensing device).

In an embodiment, the fingerprint detector DRV_FP may generate or store a fingerprint or a template thereof, based on a fingerprint image sensed in a fingerprint registration mode. The template may include at least one fingerprint image which becomes a reference image (or comparison reference image) used during fingerprint authentication, or include information of a singular point and minutiae, which are extracted from at least one fingerprint image.

Figure 4:
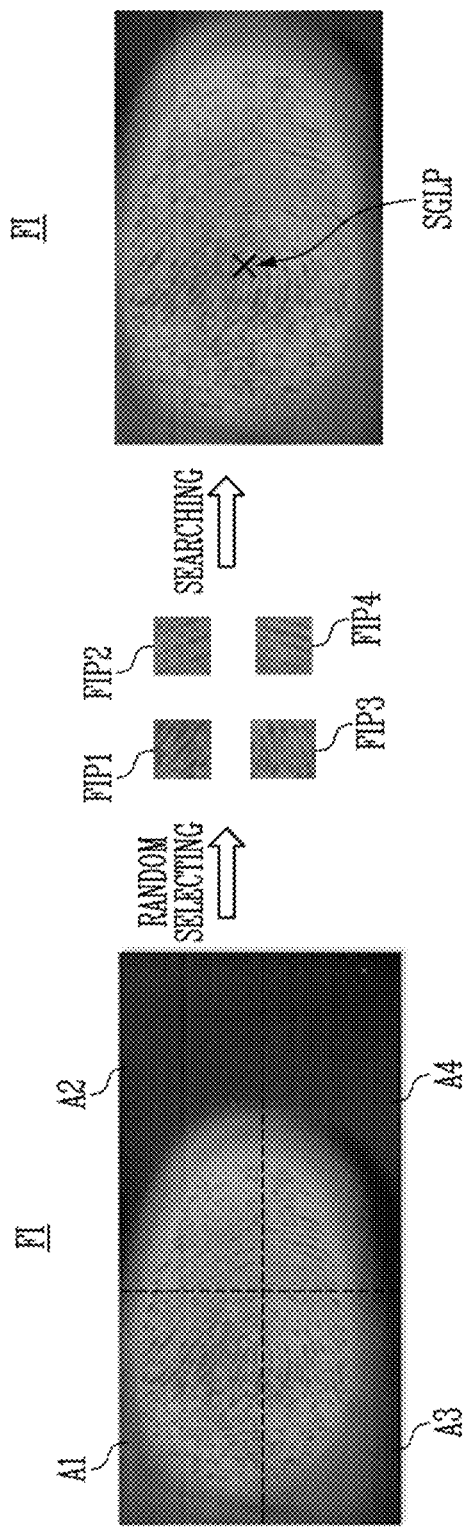
FIG. 4 is a diagram illustrating an example of an operation of a singular point determiner included in the fingerprint authentication device shown in FIG. 3.

A fingerprint may include ridges and valleys, which form curves of a surface of a finger. A fingerprint image is expressed by these ridges and valleys. The ridges may be expressed with dark lines, and the valleys between the ridges may be expressed brightly. An example of a fingerprint image is illustrated in FIG. 4.

In an embodiment, a singular point of a fingerprint image may include at least one of a core and a delta of a fingerprint. The core of the fingerprint may be a portion including an innermost ridge of the fingerprint, and may be a central portion at which an inclination change of the ridge is most severe. The delta of the fingerprint may be a spot having a shape similar to a delta shape (delta) through which different patterns of the fingerprint pass.

A relatively large number of minutiae may be detected at the periphery of the singular point. A minutia of a fingerprint is a portion of the fingerprint compared to perform fingerprint authentication, and may include a feature of fingerprint information. For example, the minutia may correspond to an end point of a ridge, an intersection point at which ridges branch off from each other or meet each other, a junction, etc.

In an embodiment, the fingerprint detector DRV_FP may perform fingerprint authentication by comparing a fingerprint image acquired in a fingerprint authentication mode (e.g., data acquired through a sensing operation of the sensor pixels SPXL) with registered fingerprint information (e.g., a template).

The fingerprint detector DRV_FP in accordance with embodiments of the present disclosure may calculate a coordinate of a singular point from a fingerprint image sensed in fingerprint authentication, and extract an interest region including the singular point. The interest region including the singular point with respect to the same area may include a much greater number of minutiae than a region including no singular point.

Thus, fingerprint authentication time may be decreased and authentication performance may be increased according to embodiments of the present disclosure.

Figure 2A:
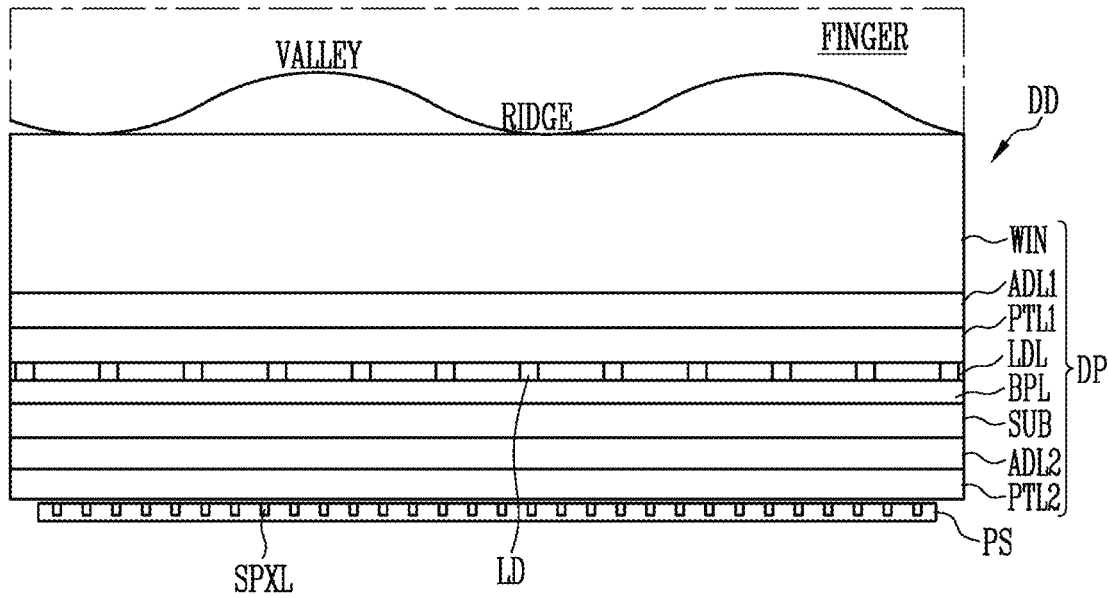
FIG. 2A is a cross-sectional view illustrating an example of the display device shown in FIG. 1.

FIG. 2A is a cross-sectional view illustrating an example of the display device shown in FIG. 1.

Referring to FIGS. 1 and 2A, the display device DD may include the display panel DP and a biometric sensor PS (or fingerprint sensor) disposed on a lower surface of the display panel DP in the fingerprint sensing region FSA. Also, the display device DD may include a substrate SUB, and a circuit element layer BPL, a light emitting device layer LDL, a first protective layer PTL1, a first adhesive layer ADL1, and a window WIN, which are sequentially disposed on an upper surface of the substrate SUB. Also, the display device DD may include a second adhesive layer ADL2 and a second protective layer PTL2, which are sequentially disposed on a lower surface of the substrate SUB in the fingerprint sensing region FSA.

The substrate SUB is a base substrate of the display panel DP, and may be, for example, a substantially transparent transmissive substrate. The substrate SUB may be a rigid substrate including glass or tempered glass, or a flexible substrate made of plastic. However, the material of the substrate SUB is not limited thereto, and the substrate SUB may be made of various materials.

The circuit element layer BPL may be disposed on the upper surface of the substrate SUB, and include at least one conductive layer. For example, the circuit element layer BPL may include a plurality of circuit elements constituting pixel circuits of the pixels PXL and lines for supplying various power sources and signals for driving the pixels PXL. The circuit element layer BPL may include various types of circuit elements such as, for example, at least one transistor and at least one capacitor, and a plurality of conductive layers constituting lines connected to the circuit elements. Also, the circuit element layer BPL may include at least one insulating layer provided between the plurality of conductive layers.

The light emitting device layer LDL may be disposed on an upper surface of the circuit element layer BPL. The light emitting device layer LDL may include a plurality of light emitting devices LD connected to the circuit elements and/or the lines of the circuit element layer BPL through, for example, contact holes, etc.

In an embodiment, at least one of the plurality of light emitting devices LD may be provided in each pixel PXL. For example, the light emitting device LD may be configured as an organic light emitting diode or an inorganic light emitting diode such as a micro light emitting diode or a quantum dot light emitting diode. Also, the light emitting device LD may be a light emitting device made of a combination of an organic material and an inorganic material. Further, in an embodiment, each of the pixels PX may include a single light emitting device LD. Alternatively, in an embodiment, each of the pixels PX may include a plurality of light emitting devices, and the plurality of light emitting devices may be connected in parallel to each other, be connected in series to each other, or be connected in series and in parallel to each other.

The first protective layer PTL1 may be disposed on the top of the light emitting device layer LDL and may cover the display region AA. The first protective layer PTL1 may include an encapsulating member such as, for example, a thin film encapsulation (TFE) layer or an encapsulation substrate, and may additionally include, for example, a protective film, etc. in addition to the encapsulating member.

The first adhesive layer ADL1 is disposed between the first protective layer PTL1 and the window WIN and couples the first protective layer PTL1 and the window WIN to each other. The first adhesive layer ADL1 may include a transparent adhesive such as, for example, an optically clear adhesive (OCA), and may include various adhesive materials in addition to the transparent adhesive.

The window WIN is a protective member disposed at an uppermost portion of the display device DD including the display panel DP, and may be a transparent transmissive substrate. The window WIN may have a multi-layered structure including at least one of, for example, a glass substrate, a plastic film, and a plastic substrate. The window WIN may include a rigid or flexible substrate. However, the material constituting the window WIN is not particularly limited.

In embodiments, the display device DD may further include a polarizing plate, an anti-reflective layer, and/or a touch sensor layer (touch electrode layer). For example, the display device DD may further include a polarizing plate and/or a touch sensor layer disposed between the first protective layer PTL1 and the window WIN.

The second protective layer PTL2 may be disposed on the lower surface of the substrate SUB. The second protective layer PTL2 may be coupled to the substrate SUB by the second adhesive layer ADL2. The second adhesive layer ADL2 may include a transparent adhesive such as an OCA. The second adhesive layer ADL2 may include a pressure sensitive adhesive (PSA) in which an adhesive material acts when pressure for allowing the second adhesive layer ADL2 to be adhered to an adhesive surface is applied.

The second protective layer PTL2 may prevent, for example, oxygen and moisture from being introduced into the display device DD from outside of the display device DD, and may be provided in the form of a single layer or multi-layer. The second protective layer PTL2 may be configured in a film form, which may further ensure flexibility of the display panel DP. The second protective layer PTL2 may be coupled to the biometric sensor PS through another adhesive layer including a transparent adhesive such as an OCA.

In an embodiment, when the biometric sensor PS includes a photo sensor, a selective light blocking film may be further provided on the bottom of the second protective layer PTL2. The selective light blocking film blocks a specific frequency region, e.g., ultraviolet light in external light introduced to the display device DD, and may prevent the corresponding light from being incident into sensor pixels SPXL of the biometric sensor PS.

The biometric sensor PS is attached to the lower surface (e.g., the rear surface) of the display panel DP through, for example, an adhesive, etc., and overlaps at least one area of the display panel DP. For example, the biometric sensor PS may overlap the display panel DP in the fingerprint sensing area FSA. The biometric sensor PS may include a plurality of sensor pixels SPXL dispersed at a predetermined resolution and/or a predetermined distance.

In an embodiment, when the biometric sensor PS includes a photo sensor, an optical system which provides a light path by concentrating lights advancing toward the biometric sensor PS may be provided on the biometric sensor PS. In the optical system, a width of a light transmitting part for guiding light may be determined by considering sensing precision and light conversion efficiency. The concentration ratio of lights incident into the biometric sensor PS may be improved by the optical system. In embodiments, the optical system may be formed of optical fiber, silicon, etc.

The sensor pixels SPXL may have an appropriate number, an appropriate size, and an appropriate arrangement such that a fingerprint image to be identifiable from electrical signals output by the sensing pixels SPXL can be generated.

The distance between the sensor pixels SPXL may be densely set such that reflected light reflected from an object to be observed (e.g., a fingerprint, etc.) can be incident into at least two adjacent sensor pixels SPXL.

Figure 2B:
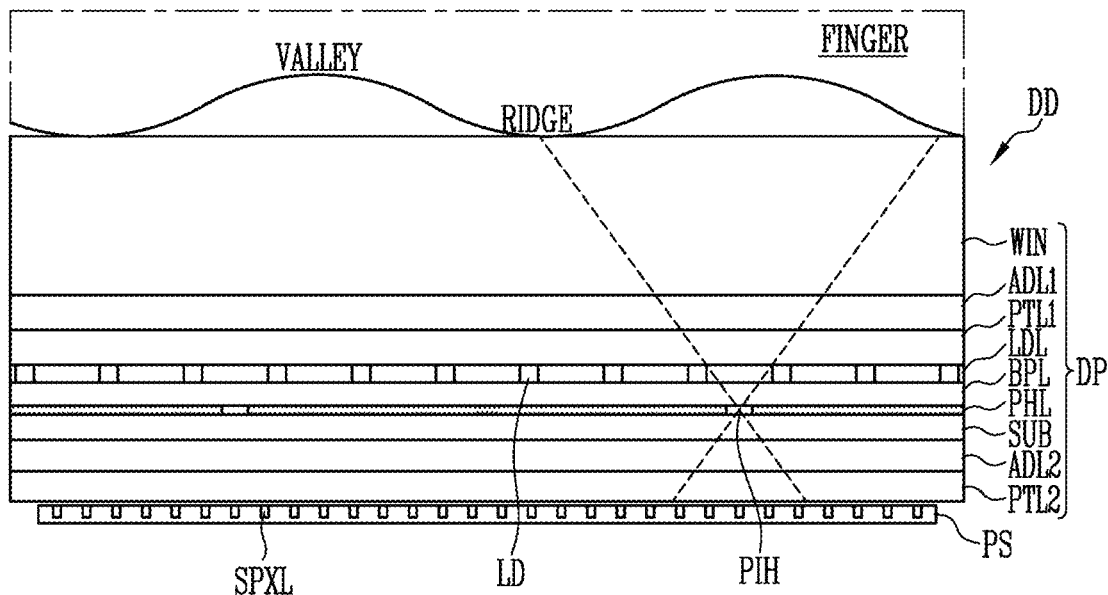
FIG. 2B is a cross-sectional view illustrating an example of the display device shown in FIG. 1.

FIG. 2B is a cross-sectional view illustrating an example of the display device shown in FIG. 1.

Referring to FIGS. 1 to 2B, the display device DD including a function as an optical system may further include a light blocking layer PHL including pin holes PIH. The light blocking layer PHL may be disposed in the display panel DP or between the display panel DP and the sensor pixels SPXL, and may block some of the lights incident into the sensor pixels SPXL. For example, some of the lights incident into the light blocking layer PHL may be blocked, and the others may reach the sensor pixels SPXL under the light blocking layer PHL by passing through the pin holes PIH.

Each of the pin holes PIH may mean an optical hole, and be a kind of light passing hole. For example, the pin hole PHI may be a light passing hole having the smallest size (area) among light passing holes disposed when layers of the display device DD overlap each other, and may be disposed on a path along which reflected light passes through the display panel DP in an oblique direction or vertical direction and then is incident into the sensor pixels SPXL.

The pin holes PIH may have a predetermined width, e.g., a width in a range of about 5 um to about 20 um. In this manner, the width of an optical opening area, which is to be secured in each layer of the display device 1000, may be gradually increased as each pin hole PIH becomes more distant from the light blocking layer PHL (e.g., as the pin hole PIH approaches in upper and lower directions).

Only reflected lights passing through the pin holes PIH may reach the sensor pixels SPXL. For example, in embodiments, lights blocked by the light blocking layer PHL do not reach the sensor pixels SPXL, and lights passing through the pin holes PIH may reach the sensor pixels SPXL. A phase of light reflected from a fingerprint by the pin hole PIH having a very narrow width and a phase of an image formed in the biometric sensor PS may have a difference of about 180 degrees.

The sensor pixels SPXL may output a sensing signal SS. The sensing signal SS may be a voltage signal corresponding to reflected light received thereto.

It is to be understood that the above examples are merely illustrative, and the configuration, arrangement, driving method, etc. of a photo sensor for detecting light reflected from a fingerprint are not limited to the biometric sensor PS shown in FIG. 2B.

Figure 2C:
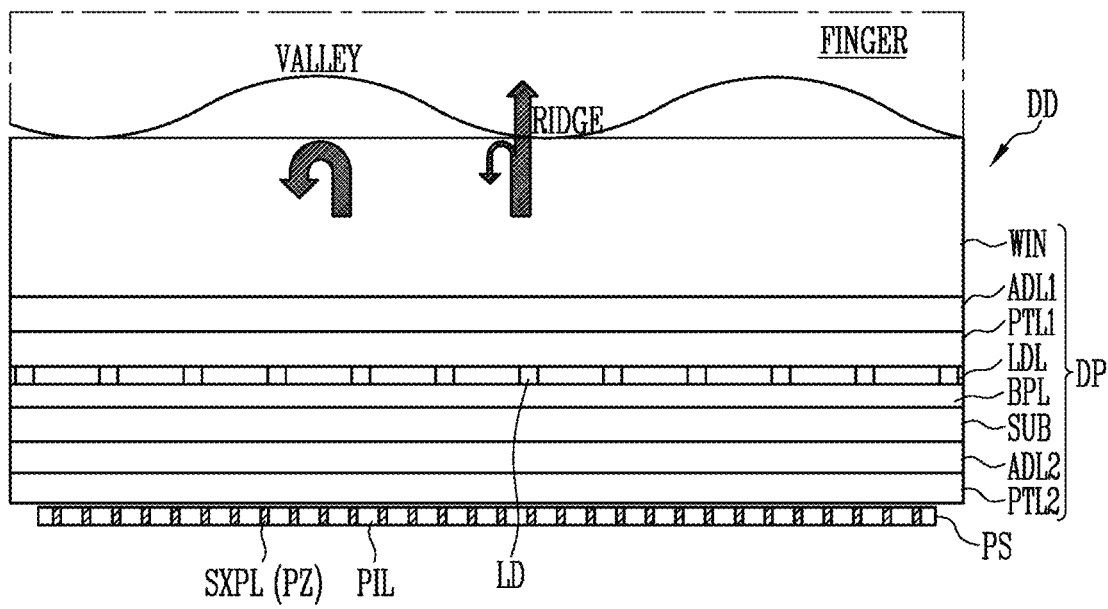
FIG. 2C is a cross-sectional view illustrating an example of the display device shown in FIG. 1.

FIG. 2C is a cross-sectional view illustrating an example of the display device shown in FIG. 1.

Referring to FIGS. 1, 2A, and 2C, the biometric sensor PS may include an ultrasonic sensor. The sensor pixels SPXL (see FIG. 2A) may be implemented with a piezoelectric element PZ. A filling material PIL that insulates vibrations between the piezoelectric elements PZ may be filled between the piezoelectric elements PZ.

Each of the piezoelectric elements PZ may include a vibrator and electrodes disposed on a top surface and a bottom surface of the vibrator. The vibrator may include a material such as, for example, titanate zirconate lead (PZT), which is easily vibrated.

When an AC voltage having a specific frequency is applied to the electrodes of the piezoelectric elements PZ, an ultrasonic wave having a specific frequency (e.g., about 12 MHz) may be emitted while the vibrator is being vertically vibrated.

At a valley portion of a fingerprint, a majority of ultrasonic waves do not pass the window WIN, but rather, are reflected due to a medium difference between the window WIN and air. In contrast, at a ridge portion of the fingerprint, which is in contact with the window WIN, some of the ultrasonic waves may pass through the window WIN, and only the other of the ultrasonic waves may be reflected toward the biometric sensor PS. That is, the intensity of the ultrasonic wave incident into each of the sensor pixels SPXL may be changed according to whether the ultrasonic wave is caused by a valley or a ridge of the fingerprint. Thus, the sensor pixels SPXL may output a sensing signal SS having different electrical characteristics, corresponding to the intensity of the ultrasonic wave.

Figure 3:
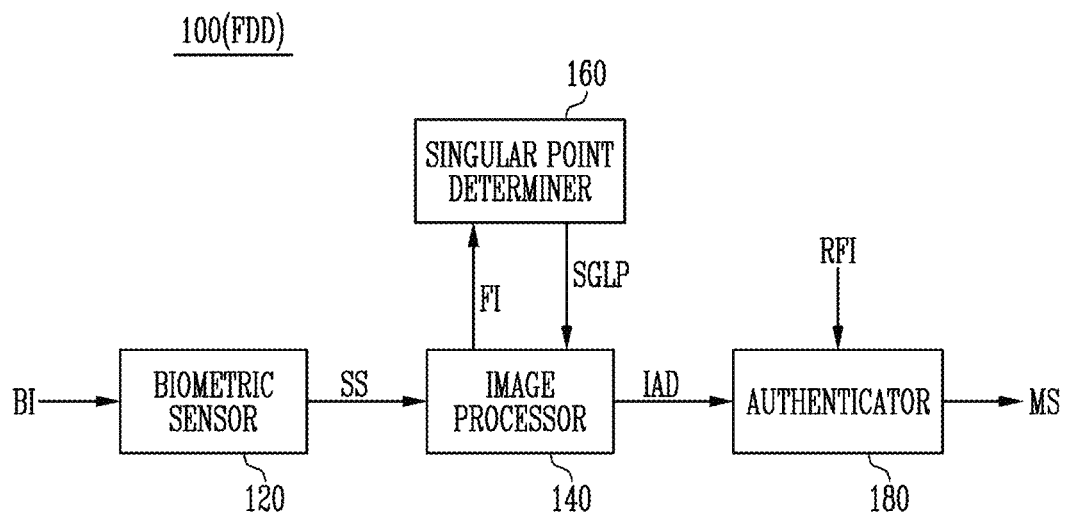
FIG. 3 is a block diagram illustrating an example of a fingerprint authentication device included in the display device shown in FIG. 1.
Figure 5:
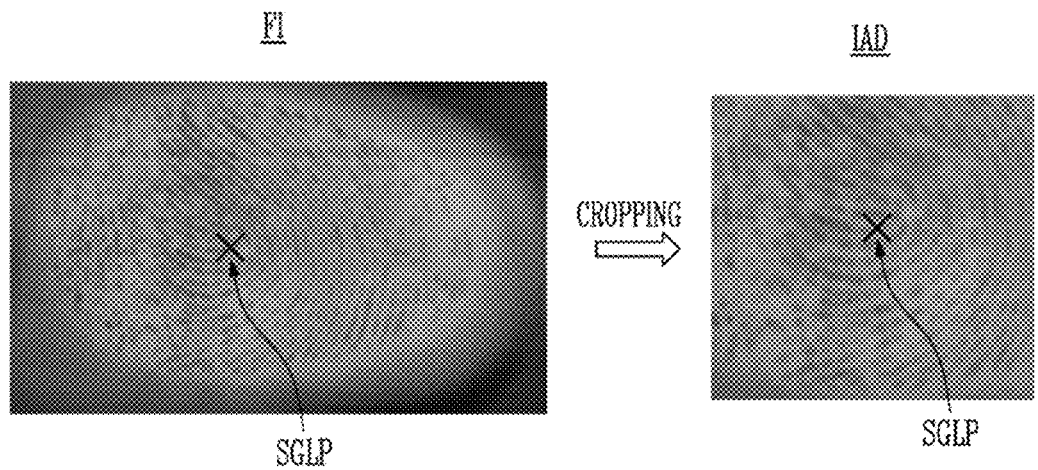
FIG. 5 is a diagram illustrating an example of an operation of an image processor included in the fingerprint authentication device shown in FIG. 3.

FIG. 3 is a block diagram illustrating an example of a fingerprint authentication device included in the display device shown in FIG. 1. FIG. 4 is a diagram illustrating an example of an operation of a singular point determiner included in the fingerprint authentication device shown in FIG. 3. FIG. 5 is a diagram illustrating an example of an operation of an image processor included in the fingerprint authentication device shown in FIG. 3.

Referring to FIGS. 3 to 5, the fingerprint authentication device 100 included in the display device DD may include a biometric sensor 120, an image processor 140, a singular point determiner 160 (also referred to as a singular point determiner circuit), and an authenticator 180 (also referred to as an authenticator circuit).

The biometric sensor 120 may generate a sensing signal SS by sensing biometric information. In an embodiment, the biometric sensor 120 may be the photo sensor or the ultrasonic sensor, which is described with reference to FIGS. 2A to 2C. However, this is merely illustrative, and the biometric sensor 120 is not limited thereto. For example, the biometric sensor 120 may include various types of sensors according to various embodiments.

In an embodiment, the fingerprint sensing region FSA may have a shape and size that are shaped and dimensioned to allow the user's fingerprint to be placed within the fingerprint sensing region FSA for fingerprint detection. For example, in an embodiment, the fingerprint sensing region FSA, in which the biometric sensor 120 senses a fingerprint or biometric information, may have a quadrangular shape and may have a size of about 11 mm×about 11 mm (width× length). Accordingly, a real fingerprint portion included in a fingerprint image may have a size smaller than that of the fingerprint sensing region FSA. In addition, in embodiments, a plurality of fingerprints (fingers) may be substantially simultaneously sensed in the fingerprint sensing region FSA.

In an embodiment, the singular point determiner 160 may select at least one of a plurality of fingerprint pieces FIP1 to FIP4 from the biometric information BI. In an embodiment, the singular point determiner 160 may extract (or select) at least one of the fingerprint pieces FIP1 to FIP4 from a fingerprint image FI image-processed by the image processor 140. For example, in an embodiment, the biometric sensor 120 may generate the sensing signal SS by sensing the biometric information BI, the image processor 140 may generate the fingerprint image FI based on the sensing signal SS, and the singular point determiner 160 may select at least one of the fingerprint pieces FIP1 to FIP4 from the fingerprint image FI and may determine a singular point SGLP of the fingerprint image FI by analyzing the selected at least one fingerprint piece. The image processor 140 may further extract an interest region IAD (also referred to as a real interest region) including the singular point SGLP from the fingerprint image FI based on a coordinate of the singular point SGLP, and the authenticator 180 may perform fingerprint authentication by comparing the interest region IAD with registered fingerprint information. This process is described in further detail below.

A size of each of the fingerprint pieces FIP1 to FIP4 and a total sum of the sizes may be smaller than that of a real interest region IAD. Therefore, the processing time used to predict a coordinate of a singular point SGLP may be shortened.

Data of the selected fingerprint pieces FIP1 to FIP4 may be stored in a predetermined memory.

In an embodiment, the singular point determiner 160 may divide the sensing region FSA or the fingerprint image FI into k (k is an integer greater than 1) sampling regions A1 to A4, and may select fingerprint pieces FIP1 to FIP4 corresponding to an arbitrary position of each of the k regions A1 to A4. That is, the number of fingerprint pieces FIP1 to FIP4 may correspond to the number of k regions A1 to A4. Although a case in which the fingerprint image FI is divided into the four sampling regions A1 to A4 has been illustrated in FIG. 4, a number of sampling images and a number of fingerprint pieces are not limited thereto. For example, in embodiments, the performance of the singular point determiner 160 may be increased through self-machine learning, and the singular point determiner 160 may accurately calculate the singular point SGLP from one fingerprint piece.

The sampling regions A1 to A4 and the fingerprint pieces FIP1 to FIP4 may be randomly determined.

The singular point determiner 160 may determine the singular point SGLP of the fingerprint image FI by analyzing the fingerprint pieces FIP1 to FIP4. For example, the singular point SGLP may include a core and/or a delta of a fingerprint.

In an embodiment, the singular point determiner 160 may set a detection model for determining the singular point SGLP through machine learning. The singular point determiner 160 may search and acquire the singular point SGLP by applying, to the detection model, ridges and valleys, which are derived from each of the fingerprint pieces FIP1 to FIP4. That is, in an embodiment, the singular point determiner 160 may determine the singular point SGLP using machine learning based on a detection model set by the singular point determiner 160. For example, the singular point SGLP may be predicted based on directions of the ridges and the valleys, advancing tendencies of the ridges and the valleys in the fingerprint pieces FIP1 to FIP4, etc.

In an embodiment, the singular point determiner 160 may include an artificial intelligence (AI) program or an AI module, which generates and updates a detection model. The singular point determiner 160 may set a detection model for detecting the singular point SGLP by using an AI technique based on deep learning. For example, the AI technique based on deep learning (or learning algorithm) may include a deep belief network, an autoencoder, a convolution neural network (CNN), a recurrent neural network (RNN), a deep Q-network, etc. However, the AI technique based on deep learning is merely illustrative, and is not limited thereto.

In an embodiment, the singular point determiner 160 may set a detection model for detecting the singular point SGLP through machine learning on fingerprint images for machine learning, which are provided from outside of the display device DD. For example, in an embodiment, the singular point determiner 160 may set the detection model used to detect the singular point SGLP based on at least one fingerprint image provided from outside of the display device (and outside of the fingerprint authentication device 100) which are used for machine learning. A fingerprint image provided from outside of the display device DD (and outside of the fingerprint authentication device 100) used for machine learning may also be referred to herein as a model fingerprint image.

For example, the singular point determiner 160 may set a function (e.g., referred to as a preliminary detection model) of calculating a coordinate of the singular point SGLP through machine learning on fingerprint images for machine learning. Also, the singular point determiner 160 may set a function of restoring a fingerprint image in a shape most similar to that of a fingerprint image for machine learning by using fingerprint pieces (e.g., FIP1 to FIP4) arbitrarily selected from the fingerprint images for machine learning, through machine learning on the fingerprint images for machine learning. For example, the singular point determiner 160 may increase the accuracy of image restoration through machine learning of restoring an image by using fingerprint pieces and repeatedly comparing the restored image with an image for machine learning, which becomes a reference of the restored image and machine learning using various fingerprint images for machine learning.

Also, the singular point determiner 160 may update the function of the preliminary detection model as a more elaborate detection model through machine learning of calculating the coordinate of the singular point SGLP from the restored fingerprint image.

Accordingly, the singular point determiner 160 may acquire the coordinate of the singular point SGLP of the fingerprint image FI through random selection of the fingerprint pieces FIP1 to FIP4 and searching using the random selection.

The process of setting a detection model through machine learning on fingerprint images for machine learning may be referred to as preliminary machine learning.

In an embodiment, the singular point determiner 160 may update the detection model through additional machine learning using the fingerprint image FI generated by the image processor 140 through real fingerprint sensing, the fingerprint pieces FIP1 to FIP4 of the fingerprint image FI, and the real interest region IAD. This machine learning process may be performed in a manner similar to that of the preliminary machine learning.

The process of updating the detection model by machine-learning for the fingerprint image FI or biometric information BI actually sensed through the biometric sensor 120 may be referred to as real-time machine learning.

Image information restored to acquire the fingerprint pieces FIP1 to FIP4 and the singular point SGLP, which are selected in real fingerprint authentication, may be stored in a predetermined memory.

The image processor 140 may generate the fingerprint image FI from the sensing signal SS. In an embodiment, the image processor 140 may convert the sensing signal SS having an analog voltage level into digital data, and generate the fingerprint image FI by using the converted digital data. In an embodiment, the image processor 140 may perform additional image processing on the fingerprint image FI.

As shown in FIG. 5, the image processor 140 may extract the interest region IAD including the singular point SGLP from the fingerprint image FI, based on the coordinate of the singular point SGLP supplied from the singular point determiner 160. For example, the singular point SGLP may be located at or near the center of the fingerprint image. However, the location of the singular point SGLP is not limited thereto.

In an embodiment, the extraction of the interest region IAD may be performing by using a technique such as image cropping, in which image data outside of the interest region IAD is cut off and discarded.

As the area of the fingerprint sensing region FSA becomes larger, the time taken to perform fingerprint authentication and image processing increases. Thus, the processing speed may become faster as the size of the fingerprint sensing region FSA, and thus, the size of data, used for fingerprint authentication and analysis becomes smaller.

The area of the interest region IAD may be determined as a size large enough to ensure the accuracy of fingerprint authentication, which is a certain level or more. For example, the area of the interest region IAD may be set to about 30% or less of the fingerprint sensing region FSA.

The processing time to perform fingerprint authentication decreases as the size of the interest region IAD (or an image used for the fingerprint authentication) decreases. However, authentication reliability may decrease as the size of the interest region IAD decreases. However, since a relatively larger number of minutiae at the periphery of the singular point SGLP exists compared to a number of minutiae at an edge of a finger, authentication reliability of at least one predetermined reference image may be ensured even when the interest region IAD has a small area.

As described above, the fingerprint authentication device 100 and the display device DD including the same in accordance with embodiments of the present disclosure may rapidly extract the interest region IAD having a small area, which includes a large number of minutiae, by operating the existing image processing process and the AI technique in parallel (e.g., at substantially the same time). Accordingly, the authentication reliability of the biometric information BI sensed through the fingerprint sensing region FSA having a large area may be ensured while also reducing the processing time.

The authenticator 180 may perform fingerprint authentication by comparing the interest region IAD with registered fingerprint information RFI. The authenticator 180 may output a fingerprint authentication result as a matching signal MS.

In an embodiment, the authenticator 180 may calculate a similarity score indicating a similarity between characteristic information of the interest region IAD and the registered fingerprint information RFI. For example, the characteristic information and the registered fingerprint information RFI may include at least one of minutiae information, scale-invariant feature transform (SIFT) information, and phase information extracted based on a frequency domain conversion technique.

When the similarity score is equal to a predetermined threshold value or more, the authenticator 180 may approve the corresponding fingerprint (e.g., authentication is successful). When the similarity score is less than the threshold value, the authenticator 180 may reject the corresponding fingerprint or generate an authentication retry command (e.g., authentication not successful).

Figure 6A:
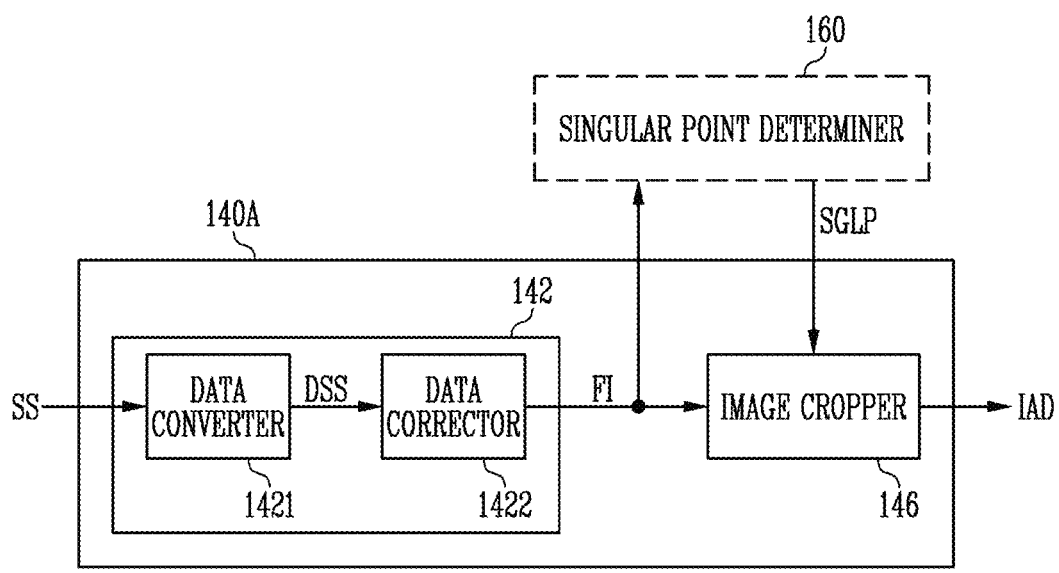
FIGS. 6A and 6B are block diagrams illustrating examples of the image processor included in the fingerprint authentication device shown in FIG. 3.
Figure 6B:
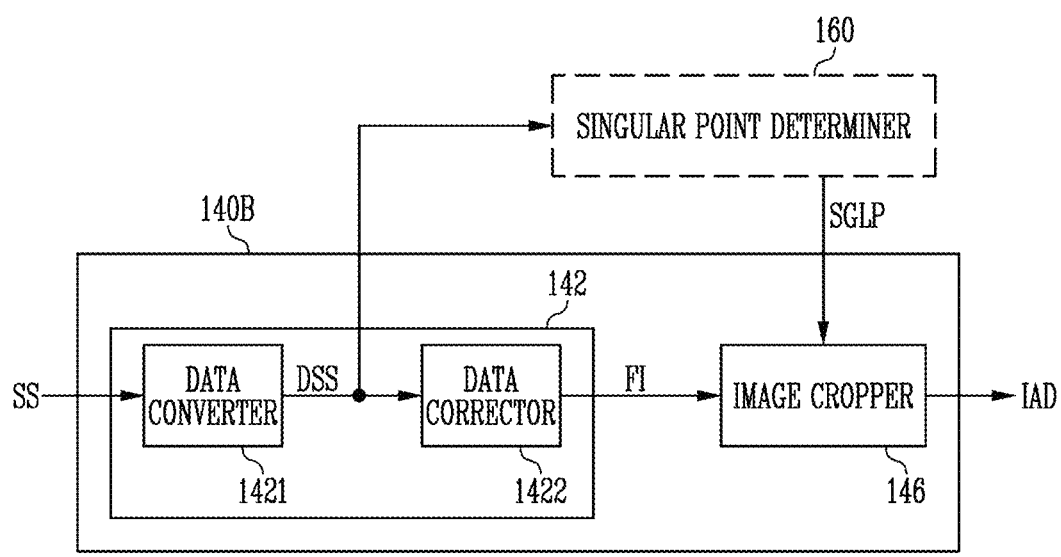

FIGS. 6A and 6B are block diagrams illustrating examples of the image processor included in the fingerprint authentication device shown in FIG. 3.

Referring to FIGS. 6A and 6B, each of image processors 140A and 140B may include a data processor 142 and an image cropper 146 (also referred to as an image cropper circuit).

The data processor 142 may generate a fingerprint image FI. In an embodiment, the data processor 142 may include a data converter 1421 (also referred to as a data converter circuit) and a data corrector 1422 (also referred to as a data corrector circuit).

The data converter 1421 may convert the sensing signal SS having an analog voltage level into sensing data DSS in a digital form. The data converter 1421 may include an analog-digital converter having various structures. For example, the data converter 1421 may convert a voltage value of a sensing region for each position, which is included in the sensing signal SS, into a digital value including grayscale information corresponding to the voltage value.

The data corrector 1422 may generate the fingerprint image FI on which image processing is performed by using the sensing data DSS. The data corrector 1422 may perform smoothing on an original image (e.g., the sensing data DSS) of the fingerprint image FI.

The data corrector 1422 may, for example, increase light and shade distinction with respect to the fingerprint image FI, remove noise, etc. The smoothing may be performed through a histogram analysis of pixels in the original image. For example, a median filter may be used for the smoothing. The smoothing may be performed by various algorithms, and is not particularly limited.

For example, the data corrector 1422 may perform binarization and thinning on the original image. The data corrector 1422 may convert a plurality of grayscale levels (e.g., at least one grayscale level from among 256 grayscale levels) into a value corresponding to 0 (black) or 1 (white). Then, ridges and valleys, which constitute a fingerprint, may be clearly distinguished as black and white. Also, the data corrector 1422 may generate a line image in which the width of the ridge is one pixel from the binarized image. The binarization and the thinning may increase the accuracy of fingerprint detection, and may be omitted in embodiments.

According to embodiments, at least one of the above-described image processing operations may be omitted, or a larger number of image processing operations may be performed.

The image cropper 146 may determine an interest region IAD having a predetermined size, which includes a singular point SGLP, in the fingerprint image FI. Also, the image cropper 146 may cut off the other portion of the fingerprint image FI except the interest region IAD. Accordingly, a calculation load in subsequent fingerprint authentication operations performed by the authenticator 180 may be reduced, and a processing speed may be increased.

In an embodiment, as shown in FIG. 5, the image cropper 146 may determine a coordinate of the singular point SGLP as a center coordinate of the interest region IAD. Therefore, the interest region IAD having the singular point SGLP as the center may be extracted.

A function of the image cropper 146 will be described in further detail below with reference to FIGS. 9A and 9B.

In an embodiment, as shown in FIG. 6A, the image processor 140A may provide the singular point determiner 160 with the fingerprint image FI generated by the data corrector 1422. The singular point determiner 160 may calculate the singular point SGLP, based on data on which image processing has been completed. Therefore, the accuracy of the singular point SGLP may be increased.

In an embodiment, as shown in FIG. 6B, the image processor 140B may provide the singular point determiner 160 with the sensing data DSS generated by the data converter 1421. Correction (image processing) of the sensing data DSS and singular point (SGLP) calculation of the singular point determiner 160 may be performed in parallel. Thus, the processing speed for extracting the interest region IAD may be increased.

Figure 7A:
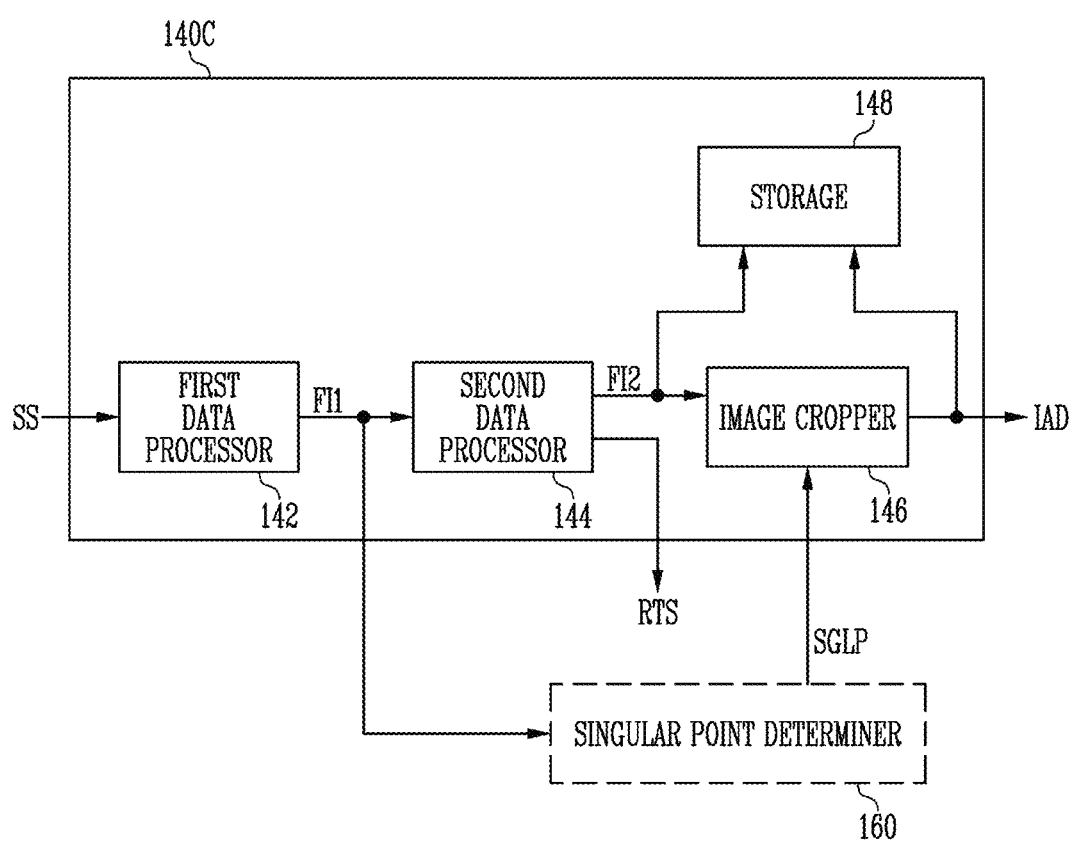
FIGS. 7A and 7B are block diagrams illustrating examples of the image processor included in the fingerprint authentication device shown in FIG. 3.
Figure 7B:
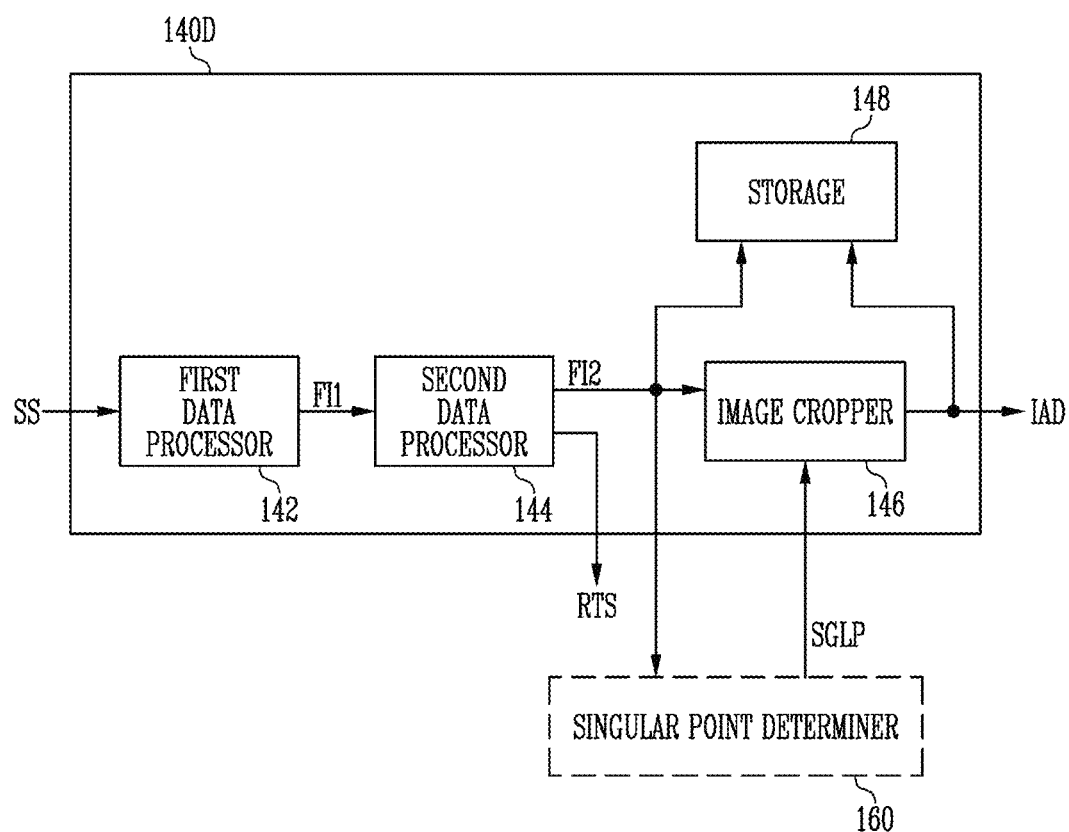
Figure 8:
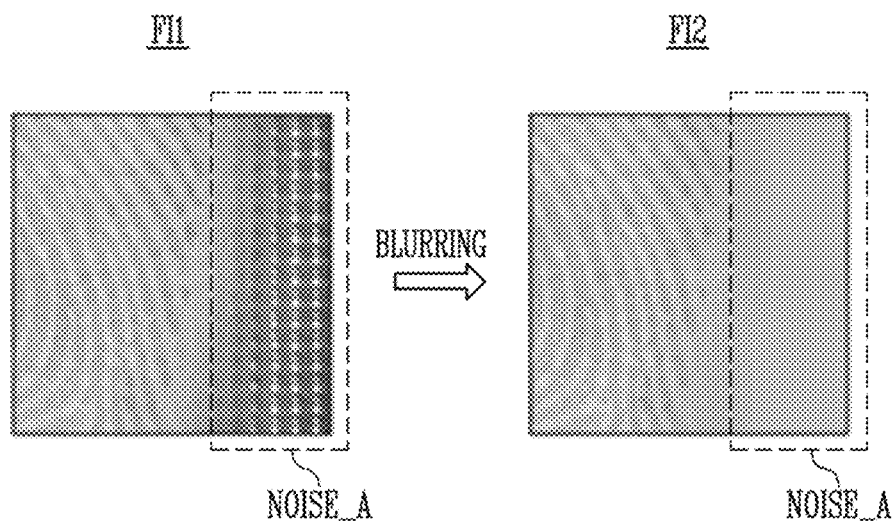
FIG. 8 is a diagram illustrating an example of an operation of a second data processor included in the image processor shown in FIG. 7A.

FIGS. 7A and 7B are block diagrams illustrating examples of the image processor included in the fingerprint authentication device shown in FIG. 3. FIG. 8 is a diagram illustrating an example of an operation of a second data processor included in the image processor shown in FIG. 7A. FIGS. 9A and 9B are diagrams illustrating an example of an operation of an image cropper included in the image processor shown in FIG. 7A.

Referring to FIGS. 1, 2, 7A, 7B, 8, 9A, and 9B, each of image processors 140C and 140D may include a first data processor 142, a second data processor 144, an image cropper 146 (also referred to as an image cropper circuit), and a storage 148.

The first data processor 142 may generate a first fingerprint image FI1 from a sensing signal SS. In an embodiment, the first data processor 142 may include the data converter 1421 and a data corrector 1422. The first data processor 142 is the same as or substantially identical to the data processor described with reference to FIGS. 6A and 6B, and thus, for convenience of explanation, a further description of elements and aspects previously described may be omitted. In addition, the first fingerprint image FI1 may be the same as or substantially identical to the fingerprint image FI described with reference to FIGS. 6A and 6B, and thus, for convenience of explanation, a further description of elements and aspects previously described may be omitted.

The second data processor 144 may detect a noise region NOISE_A influenced by noise caused by an external environment in the first fingerprint image FI1.

For example, in an embodiment, when the biometric sensor 120 includes a photo sensor, image loss may occur in a portion influenced by unwanted external light, or the portion may be misrecognized. Due to the image loss caused by external light, the reliability of fingerprint authentication may decrease, or a fingerprint authentication processing time may increase. Therefore, embodiments may perform detection of the noise region NOISE_A and may exclude the noise region NOISE_A when performing fingerprint authentication, and/or embodiments may perform additional image processing on the noise region NOISE_A.

The second data processor 144 may detect the noise region NOISE_A by analyzing the first fingerprint image FI1 and calculating a penetration direction of the external light, an intensity of the external light, etc. For example, a luminance of the noise region NOISE_A may be greater than that of a normal portion of the first fingerprint image FI1. In an embodiment, a predetermined luminance tolerance may be set, and a portion of the first fingerprint image FI1 having a luminance greater than the predetermined luminance tolerance may be determined as the noise region NOISE_A. The luminance of the noise region NOISE_A may be greater than the luminance tolerance, while the portion other than the noise region NOISE_A may be less than the luminance tolerance, due to the penetration of external light.

The second data processor 144 may generate a second fingerprint image FI2 by blurring the noise region NOISE_A. For example, the second data processor 144 may calculate a mask image in which an image for each predetermined luminance range is simplified by analyzing an image luminance for each position in the first fingerprint image FI1. The mask image is synthesized with the first fingerprint image FI1, thereby generating the second fingerprint image FI2. In an embodiment, as shown in FIG. 8, a noise region NOISE_A of the second fingerprint image FI2 may be blurred (or masked). A blurred portion may be excluded when performing fingerprint authentication (or fingerprint matching).

In addition, when an interest region IAD is extracted, a portion of the noise region NOISE_A may be unavoidably included in the interest region IAD. Since a blurring process has been performed on the noise region NOISE_A, the probability that misrecognition will occur during fingerprint authentication due to inclusion of the noise region NOISE_A in the interest region IAD may be decreased.

It is to be understood that the noise caused by the external environment is not limited to the external light, and the image processing performed on the noise region NOISE_A is not limited to the blurring. For example, in embodiments, the noise region NOISE_A may be determined by a state of skin, a state of the fingerprint sensing region FSA, a pressure in fingerprint sensing, a position at which a fingerprint is in contact with the fingerprint sensing region FSA, etc. In addition, the biometric sensor 120 may include various types of sensors such as, for example, an ultrasonic sensor and a capacitive sensor, in addition to the photo sensor. In an embodiment, a sensing signal sensed from the above-described sensors may be expressed in the above-described fingerprint image form through data conversion.

When a wrinkle in addition to a fingerprint of skin is included in the first fingerprint image FI1 (e.g., a wrinkle not belonging to the fingerprint), the second data processor 144 may analyze a wrinkle portion as noise. For example, the wrinkle may be expressed as a valley (e.g., a bright line) having a directivity different from that of the fingerprint. Also, the wrinkle may be expressed as a shape thicker than that of the valley of the fingerprint.

A relatively dry portion in the sensed fingerprint may be expressed much brighter than another portion (e.g., a relatively dry portion). The second data processor 144 may recognize the relatively dry portion of the skin and determine the relatively wet portion as the noise region NOISE_A.

In fingerprint contact, a portion of the fingerprint, to which a strong pressure is applied, may be expressed as a relatively squashed portion. That is, a width of a valley and/or a ridge at the portion to which the strong pressure is applied may be expressed wider than that of another portion. The second data processor 144 may sense such an abnormal portion, and determine the corresponding portion as the noise region NOISE_A.

When foreign matter such as, for example, a particle or moisture is sensed together with the fingerprint in at least a portion of the fingerprint sensing region FSA, a corresponding portion of the first fingerprint image FI1 may be expressed to have a width and a luminance which are different from those of a normal valley and/or a normal ridge. The second data processor 144 may sense such an abnormal portion, and determine the corresponding portion as the noise region NOISE_A.

It is to be understood that the above examples are merely illustrative, and noise caused by an external factor is not limited thereto.

The second data processor 144 may digitize noise. When the noise and/or the noise region NOISE_A is equal to at least a predetermined threshold reference value, the second data processor 144 may generate a fingerprint sensing retry command RTS. For example, when the noise region NOISE_A is detected at a plurality of portions of the fingerprint of the first fingerprint image FI1, the second data processor 144 may generate the fingerprint sensing retry command RTS. Alternatively, when a total area of the noise region NOISE_A is at least a threshold area, the second data processor 144 may generate the fingerprint sensing retry command RTS.

The driver DRV of the display device DD may display a fingerprint sensing failure image or a retry image in response to the fingerprint sensing retry command RTS. Alternatively, fingerprint sensing driving may be reset.

In an embodiment, as shown in FIG. 7A, the first data processor 142 may provide the first fingerprint image FI1 to the singular point determiner 160. The singular point determiner 160 may detect fingerprint pieces from the first fingerprint image FI1, and determine the singular point SGLP, based on the detected fingerprint pieces.

In an embodiment, as shown in FIG. 7B, the second data processor 144 may provide the second fingerprint image FI2 to the singular point determiner 160. The singular point determiner 160 may detect fingerprint pieces from the second fingerprint image FI2, and determine the singular point SGLP, based on the detected fingerprint pieces.

The image cropper 146 may determine an interest region IAD having a predetermined size, which includes a singular point SGLP, in the second fingerprint image FI2. Also, the image cropper 146 may cut off portions of the second fingerprint image FI2 except the interest region IAD. Accordingly, a calculation load during fingerprint authentication may be reduced, and a processing speed may be increased.

In an embodiment, as shown in FIG. 5, the image cropper 146 may determine a coordinate of the singular point SGLP as a center coordinate of the interest region IAD. Therefore, the interest region IAD having the singular point SGLP as the center may be extracted.

In an embodiment, the image cropper 146 may shift the center coordinate of the interest region IAD in consideration of the noise region NOISE_A.

Figure 9A:
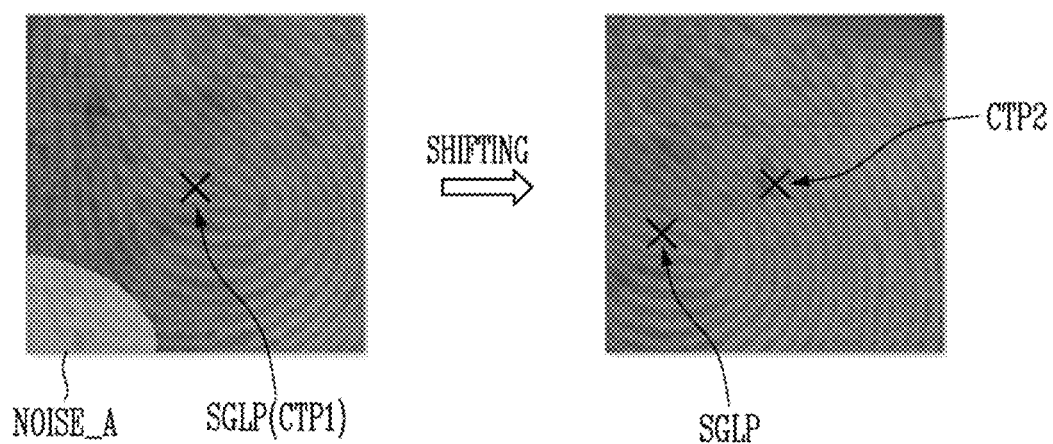
FIGS. 9A and 9B are diagrams illustrating an example of an operation of an image cropper included in the image processor shown in FIG. 7A.
Figure 9B:
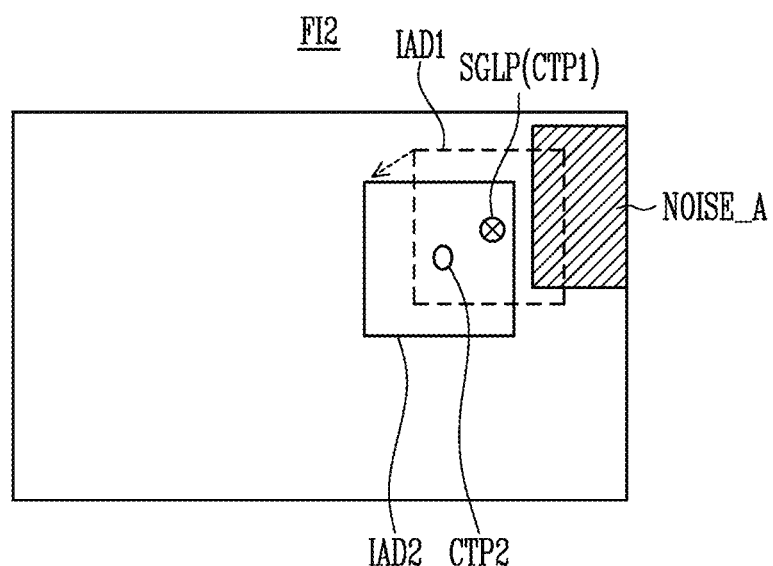

For example, as shown in FIGS. 9A and 9B, a center coordinate of a first interest region IAD1 corresponds to a coordinate of the singular point SGLP. However, the first interest region IAD1 includes a noise region NOISE_A, and the noise region NOISE_A may act as an obstructive element.

The image cropper 146 may shift a center coordinate CTP1 toward a side distant from the noise region NOISE_A, which may increase the reliability of fingerprint authentication. For example, the image cropper 146 may shift a center coordinate such that the interest region is moved away, that is, becomes more distant, from the noise region NOISE_A. A second interest region IAD2 does not include the noise region NOISE_A due to a shifted center coordinate CTP2. However, the singular point SGLP may not correspond to the shifted center coordinate CTP2. For example, the shifted center coordinate CTP2 may be located more distant from the noise region NOISE_A than the coordinate of the singular point SGLP.

The image cropper 146 may extract the second interest region IAD2 with respect to the shifted center coordinate CTP2. The second interest region IAD2 may include minutiae of which a number is greater than that of minutiae included in the first interest region IAD2 influenced by the noise region NOISE_A. Thus, a fingerprint authentication error caused by an external environmental factor may be reduced.

The storage 148 may store information of the first interest region IAD1 or the second interest region IAD2. Also, the storage 148 may store the second fingerprint image FI2. Although the same second fingerprint image FI2 is provided, the position of the interest region IAD stored in the storage 148 may be changed depending on the external environmental factor.

The authenticator 180 may compare a portion corresponding to the second interest region IAD2 of registered fingerprint information RFI with the second interest region IAD2.

As described above, in an embodiment, the image processor 140 included in the fingerprint authentication device 100 detects noise caused by an environmental factor and/or a noise region NOISE_A, and adjusts the position of an interest region IAD, based on the noise region NOISE_A. Thus, the effect an external environment factor may have on fingerprint authentication may be reduced, and the reliability of fingerprint authentication may be increased.

Figure 10:
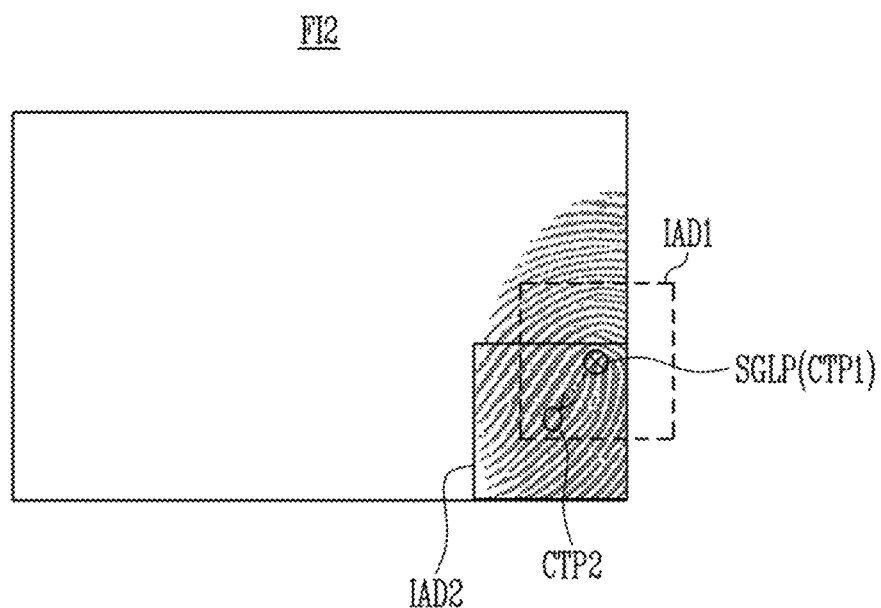
FIG. 10 is a diagram illustrating an example of the operation of the image cropper included in the image processor shown in FIG. 7A.

FIG. 10 is a diagram illustrating an example of the operation of the image cropper included in the image processor shown in FIG. 7A.

Referring to FIGS. 1, 7A, and 10, the image cropper 146 may extract an interest region IAD including a singular point from a second fingerprint image FI2.

In a fingerprint sensing region FSA having an area larger than that of a typical thumb, there may occur a case in which a fingerprint is in contact with an edge of the fingerprint sensing region FSA. FIG. 10 shows a second fingerprint image FI2 generated when a fingerprint is in contact with an edge of the fingerprint sensing region FSA.

A singular point SGLP of the second fingerprint image FI2 may be located at or near an edge of the second fingerprint image FI2, and a portion of a first interest region IAD1 extracted and corresponding to the singular point SGLP may include image information.

In an embodiment, when this occurs, for example, when the singular point SGLP is outside of a predetermined reference range of the second fingerprint image FI2, the image cropper 146 may shift a center coordinate CTP1 toward a side including a larger amount of fingerprint information, and extract a second interest region IAD2 corresponding to a shifted center coordinate CTP2.

Although a case in which the second interest region IAD2 includes the singular point SGLP has been illustrated in FIG. 10, in some cases (e.g., in an extreme case), the second interest region IAD2 may not include the singular point SGLP.

According to embodiments of the present disclosure, the reliability of fingerprint authentication on a large-area fingerprint sensing region FSA may be increased through position adjustment of the interest region IAD.

Figure 11A:
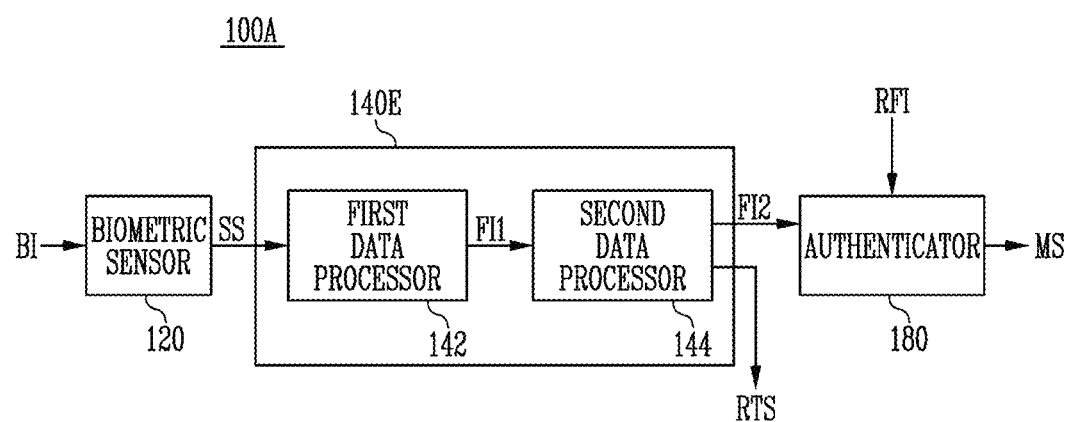
FIG. 11A is a block diagram illustrating an example of the fingerprint authentication device included in the display device shown in FIG. 1.
Figure 11B:
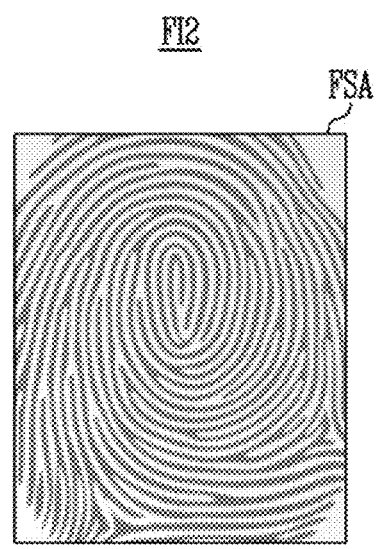
FIG. 11B is a diagram illustrating an example of a fingerprint sensing region and a fingerprint image, to which the fingerprint authentication device shown in FIG. 11A is applied.

FIG. 11A is a block diagram illustrating an example of the fingerprint authentication device included in the display device shown in FIG. 1. FIG. 11B is a diagram illustrating an example of a fingerprint sensing region and a fingerprint image, to which the fingerprint authentication device shown in FIG. 11A is applied.

Referring to FIGS. 11A and 11B, a fingerprint authentication device 100A may include a biometric sensor 120, an image processor 140E, and an authenticator 180.

The fingerprint authentication device 100A may include the biometric sensor 120 including a fingerprint sensing region FSA having a relatively small area. For example, the fingerprint sensing region FSA may have a quadrangular shape of about 10 mm×about 10 mm (width×length) or less, or a circular shape having a diameter of about 10 mm or less.

Since the fingerprint sensing region FSA has a small area, driving for detecting a singular point by using fingerprint pieces and driving for extracting a second fingerprint image FI2 by using the singular point as the center may increase a calculation load. Therefore, the second fingerprint image FI2 image-processed from a sensing signal SS may be compared with registered fingerprint information RFI, thereby performing fingerprint authentication. That is, in an embodiment in which the fingerprint authentication device 100A includes a fingerprint sensing region FSA having a small area, the singular point determiner and the image cropper may be omitted.

The image processor 140E may include the first data processor 142 and the second data processor 144.

The first data processor 142 may include the data converter 1421 and the data corrector 1422, which are described with reference to FIGS. 6A and 6B. The first data processor 142 may generate a first fingerprint image FI1 on which predetermined image processing is performed.

The second data processor 144 may detect a noise region NOISE_A influenced by noise caused by an external environment in the first fingerprint image FI1.

In an embodiment, the second data processor 144 may detect the noise region NOISE_A influence by the noise caused by the external environment in the first fingerprint image FI1. The second data processor 144 may perform additional image processing such as blurring on the noise region. Thus, distortion of the second fingerprint image FI2 due to the noise and a fingerprint authentication error may be reduced.

The second data processor 144 may digitize the noise region NOISE_A. When a digitized value is equal to greater than a threshold reference, the second data processor 144 may generate a fingerprint sensing retry command RTS before fingerprint authentication. For example, when the digitized value is equal to or greater than the threshold reference, the second data processor 144 does not transmit the second fingerprint image FI2 to the authenticator 180, and the second data processor 144 may instead generate the fingerprint sensing retry command RTS.

Accordingly, the driver DRV of the display device DD may display a fingerprint sensing failure image or a retry image in response to the fingerprint sensing retry command RTS. Alternatively, fingerprint sensing driving may be reset. In these cases, a user may re-input a fingerprint. In an embodiment, whether the fingerprint has been re-input is rapidly determined before it is determined whether fingerprint authentication has been performed. As a result, a calculation processing time and an authentication time may be reduced.

The function and configuration of the biometric sensor 120, the first data processor 142, the second data processor 144, and the authenticator 180 have been described in detail with reference to FIGS. 3 to 7B. Thus, for convenience of explanation, a further description of elements and aspects previously described may be omitted.

Figure 12:
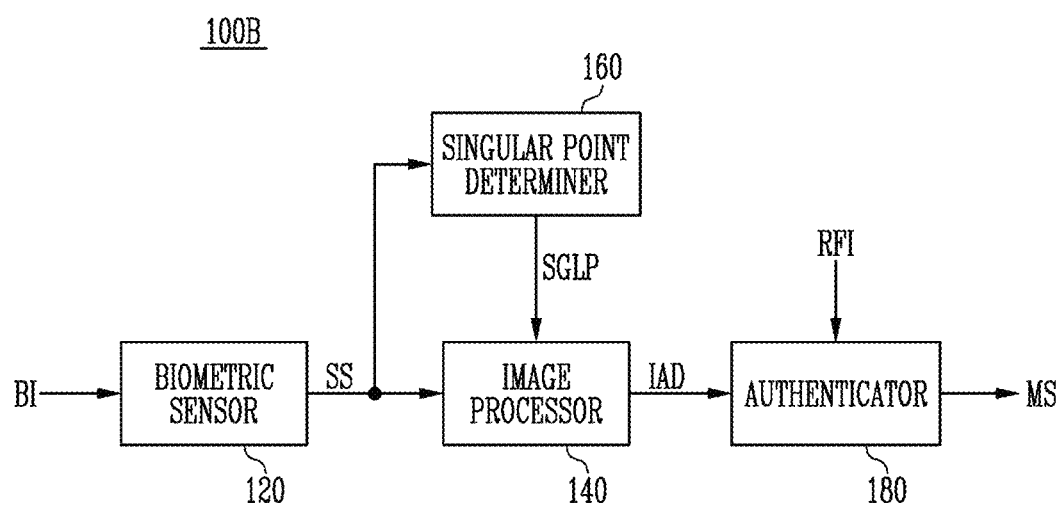
FIG. 12 is a block diagram illustrating an example of the fingerprint authentication device included in the display device shown in FIG. 1.

FIG. 12 is a block diagram illustrating an example of the fingerprint authentication device included in the display device shown in FIG. 1.

A fingerprint authentication device 100B shown in FIG. 12 is identical to the fingerprint authentication device 100 described with reference to FIG. 3, except for a signal supplied to a singular point determiner 160. Thus, for convenience of explanation, a further description of elements and aspects previously described may be omitted.

Referring to FIG. 12, the fingerprint authentication device 100B may include the biometric sensor 120, the image processor 140, the singular point determiner 160, and the authenticator 180.

In an embodiment, the biometric sensor 120 may provide a sensing signal SS in an analog form to the image processor 140 and the singular point determiner 160. The singular point determiner 160 may arbitrarily extract information of fingerprint pieces directly from the sensing signal SS. Also, the singular point determiner 160 may determine a singular point SGLP of biometric information BI (e.g., a fingerprint) input by using the extracted information of the fingerprint pieces and an AI technique.

Since image processing on the sensing signal SS and an operation of determining a coordinate of the singular point SGLP of the biometric information BI are processed in parallel, a processing time for fingerprint authentication may be reduced.

Figure 13:
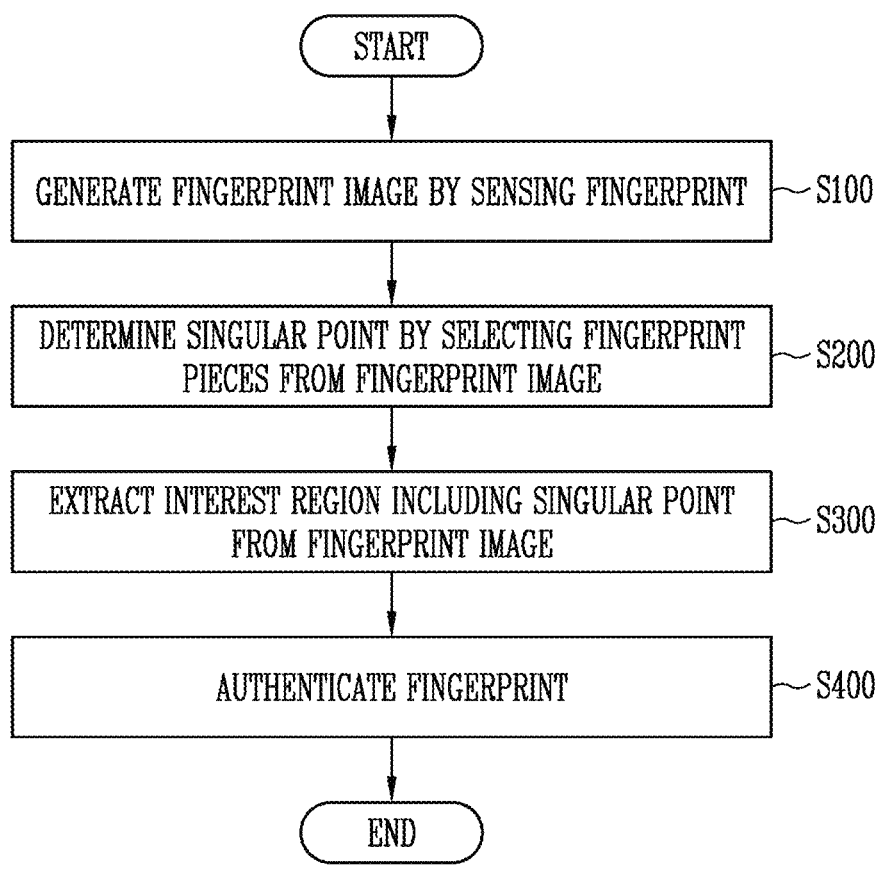
FIG. 13 is a flowchart illustrating a method of authenticating a fingerprint of the display device in accordance with embodiments of the present disclosure.

FIG. 13 is a flowchart illustrating a method of authenticating a fingerprint of the display device in accordance with embodiments of the present disclosure.

Referring to FIG. 13, the method may include generating a fingerprint image of a fingerprint sensed through the biometric sensor (S100), determining a singular point of the fingerprint image through machine learning by selecting at least one of a plurality of fingerprint pieces from the fingerprint image (S200), extracting an interest region including the singular point from the fingerprint image (S300), and authenticating the fingerprint by comparing the interest region with registered fingerprint information (S400).

In an embodiment, generating the fingerprint image (S100) may include determining a noise region by analyzing data of the fingerprint image, and generating a corrected fingerprint image by blurring the noise region.

In an embodiment, determining the singular point of the fingerprint image (S200) may be processed through an AI technique. For example, through the AI technique, the singular point may be determined by using analog sensing values directly supplied from the biometric sensor, digital sensing data obtained by converting the analog values, or data of the fingerprint image, which is obtained by performing image processing on digital sensing data (S200).

In addition, driving for generating the fingerprint image or a corrected fingerprint image (S100) and driving for determining the singular point of the fingerprint image through the AI technique (S200) may be processed in parallel. Thus, a processing time for fingerprint authentication may be reduced.

Aspects of the method have been described in detail with reference to FIGS. 3 to 12. Thus, for convenience of explanation, a further description of elements and aspects previously described may be omitted.

Figure 14:
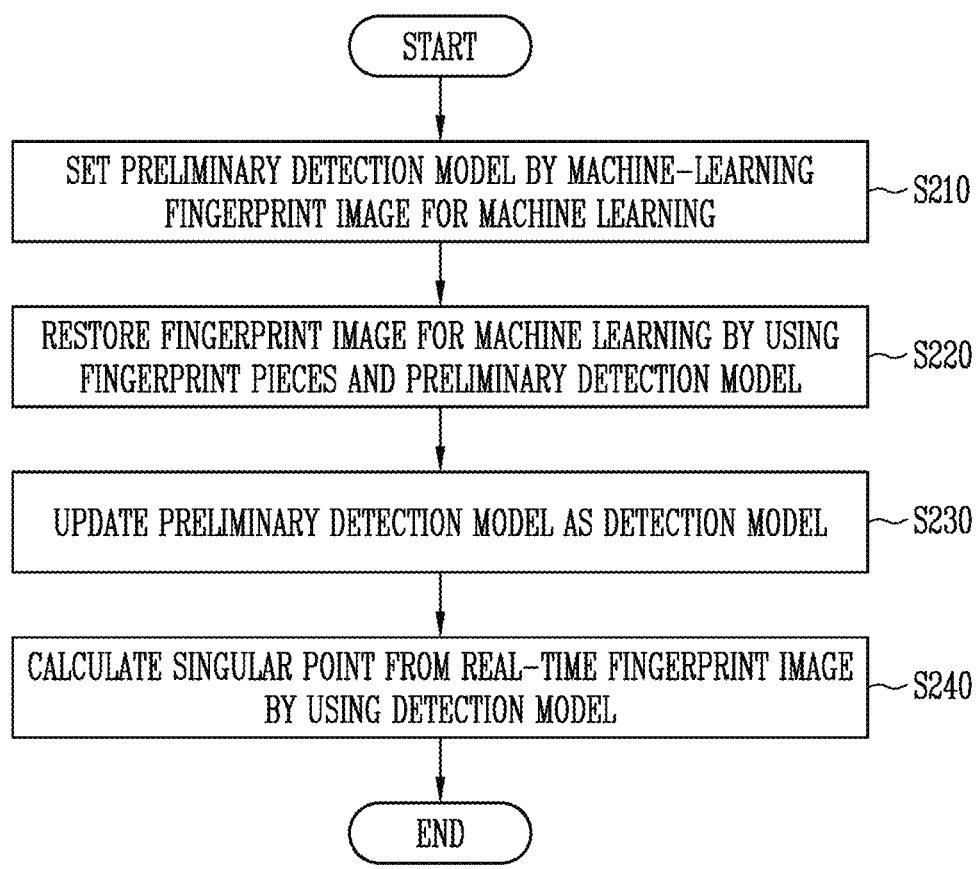
FIG. 14 is a flowchart illustrating an example of the method shown in FIG. 13.
Figure 15:
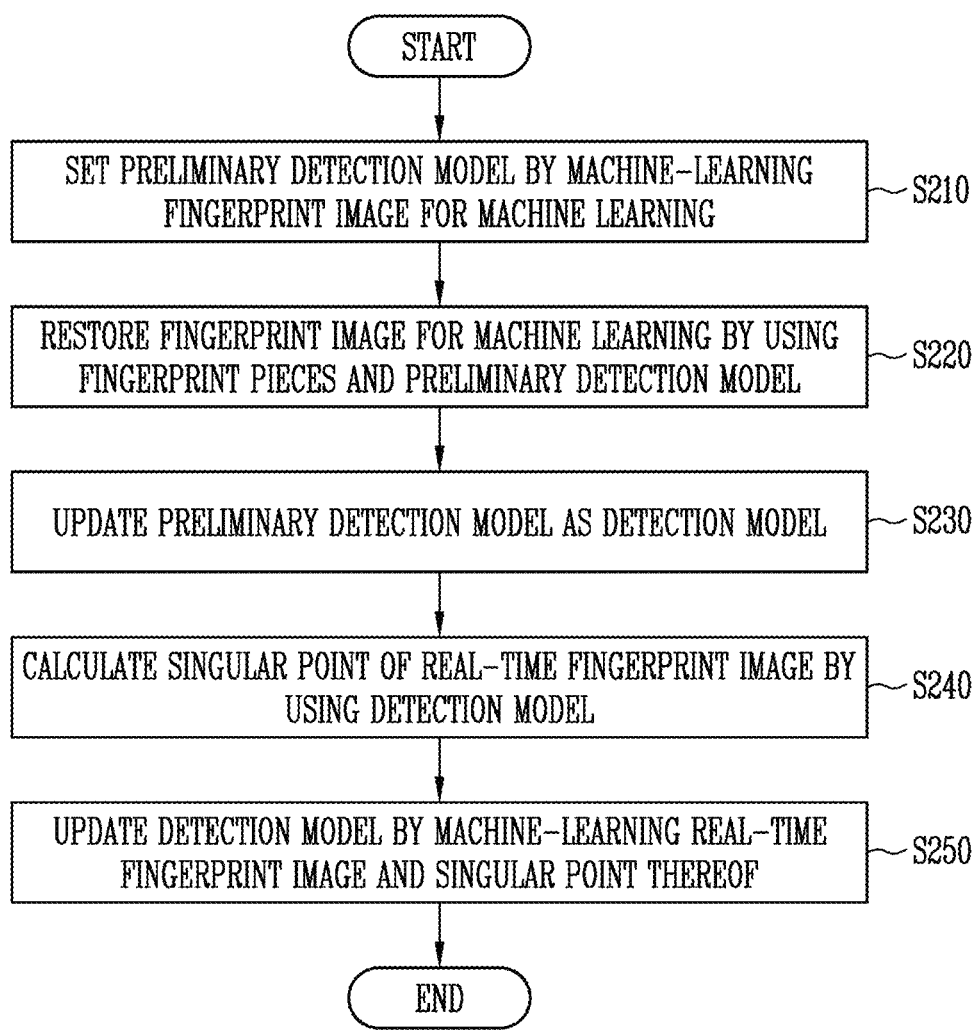
FIG. 15 is a flowchart illustrating an example of the method shown in FIG. 13.

FIG. 14 is a flowchart illustrating an example of the method shown in FIG. 13. FIG. 15 is a flowchart illustrating an example of the method shown in FIG. 13.

Referring to FIGS. 13 to 15, determining the singular point (S200) may include setting a preliminary detection model for detecting the singular point through machine learning on a fingerprint image for machine learning, which may be provided from outside of the display device DD (S210), selecting the fingerprint pieces from an arbitrary position of the fingerprint image for machine learning and restoring the fingerprint image for machine learning by using the fingerprint pieces and the preliminary detection model (S220), updating the preliminary detection model as a detection model by machine-learning the restored fingerprint image for machine learning (S230), and calculating the singular point from a real-time fingerprint image by using the detection model (S240).

Processes S210 to S230 may be a prior machine learning process of the AI technique. The singular point may be calculated from a real-time fingerprint image by AI using a prior machine-learning detection model (S240).

In an embodiment, as shown in FIG. 15, the detection model may be updated by additionally, and in real time, machine-learning the real-time fingerprint image and a singular point of the real-time fingerprint image (S250). This process may be referred to as real-time machine learning.

As described above, the processing speed at which the singular point of the fingerprint is detected by the AI technique through machine learning may be increased according to embodiments of the present disclosure. Detecting the singular point of the fingerprint has been described in detail with reference to FIGS. 3 and 4. Thus, for convenience of explanation, a further description of elements and aspects previously described may be omitted.

Figure 16:
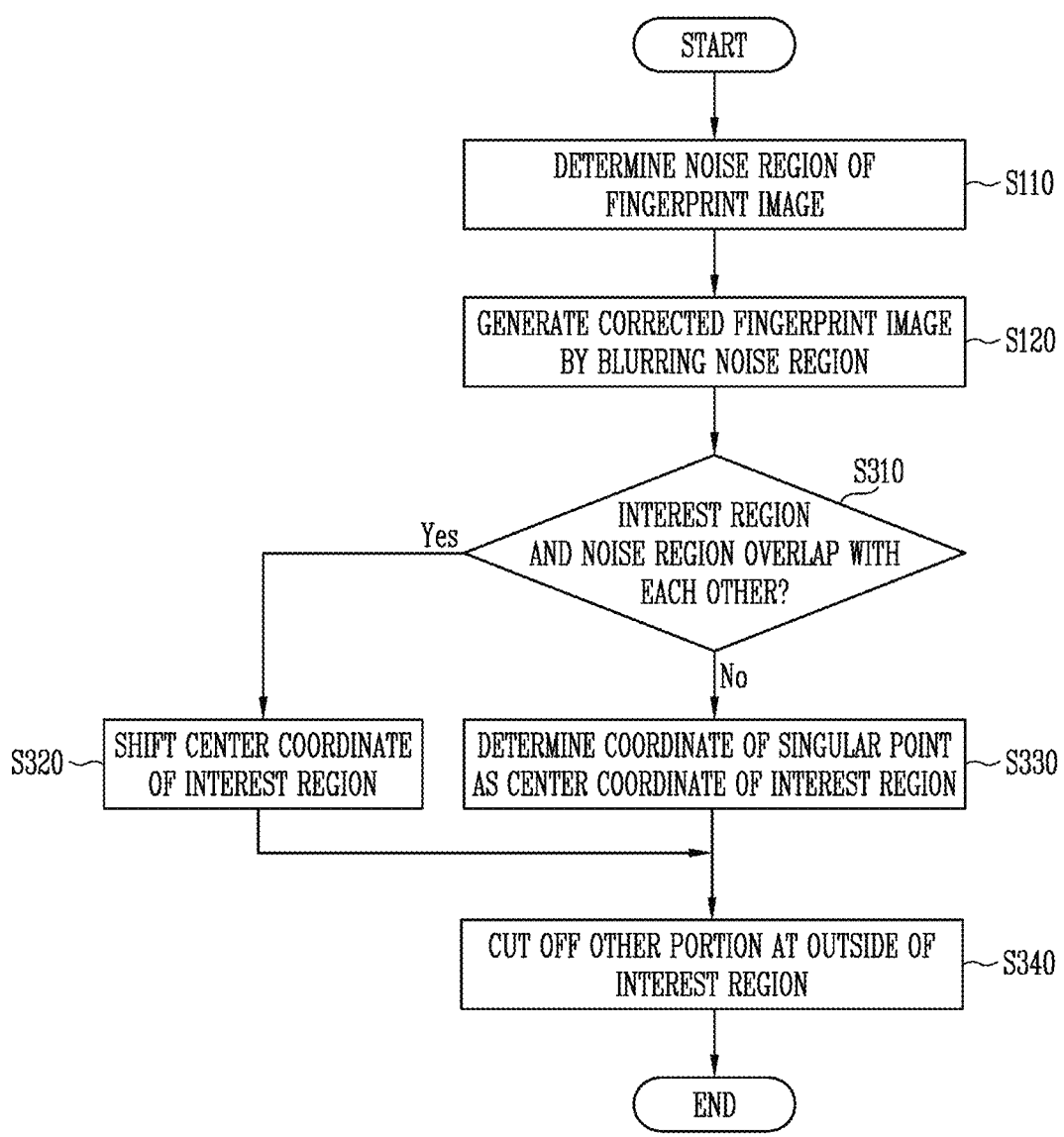
FIG. 16 is a flowchart illustrating an example of the method shown in FIG. 13.

FIG. 16 is a flowchart illustrating an example of the method shown in FIG. 13.

Referring to FIGS. 13 and 16, the method may include determining a noise region of a fingerprint image by analyzing data of the fingerprint image (S110), and generating a corrected fingerprint image by blurring the noise region (S120).

In an embodiment, in the method, an interest region may be determined by comparing the interest region with a position of the noise region (S310).

When the interest region and the noise region do not overlap each other, a coordinate of a singular point may be determined as a center coordinate of the interest region (S330).

When at least a portion of the interest region overlaps the noise region, the center coordinate of the interest region may be shifted such that the interest region becomes distant from the noise region (S320).

The other portion at the outside of the determined interest region may be cut off (S340). That is, the remaining portion other than the determined interest region may be cut off (S340).

The method shown in FIG. 16 is similar to the driving of the image processors 140, 140A, 140B, 140C, and 140D described with reference to FIGS. 5 to 9B. Thus, for convenience of explanation, a further description of elements and aspects previously described may be omitted.

Figure 17:
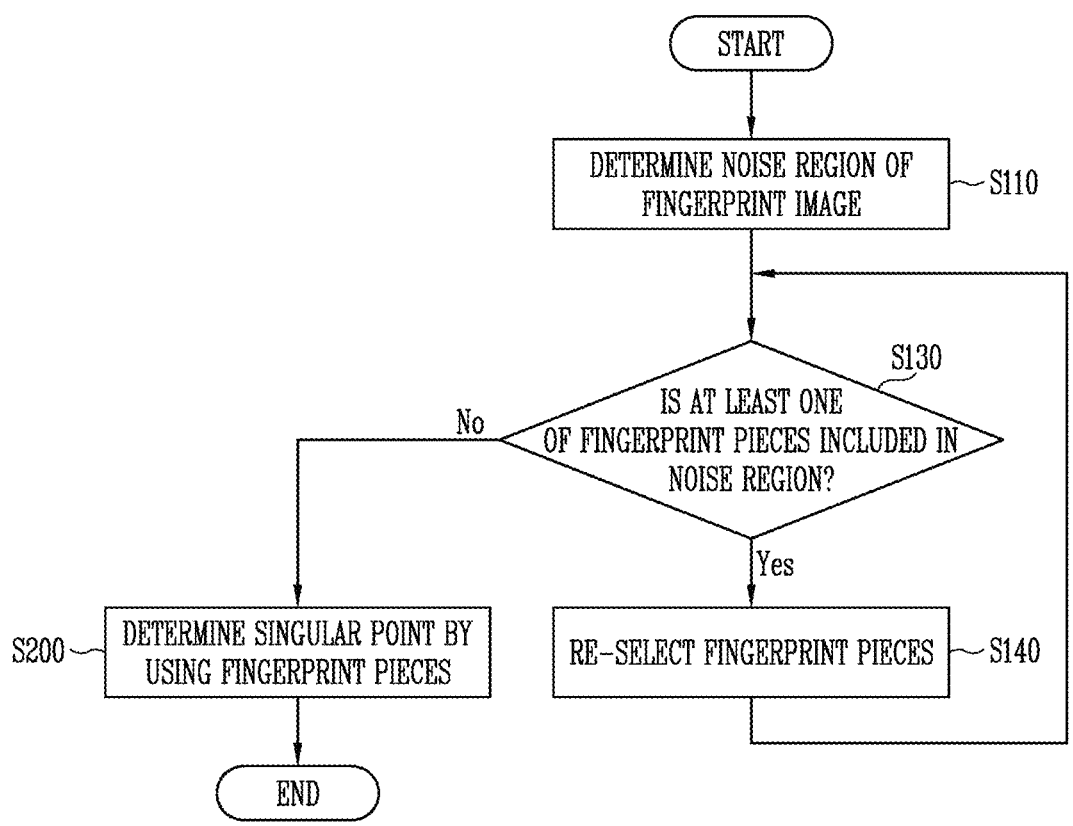
FIG. 17 is a flowchart illustrating an example of the method shown in FIG. 13.

FIG. 17 is a flowchart illustrating an example of the method shown in FIG. 13.

Referring to FIGS. 13 and 17, generating the fingerprint image (S100) may include determining a noise region by analyzing data of the fingerprint image (S110), and comparing positions of fingerprint pieces selected through AI and the noise region (S130).

In an embodiment, when at least one of the fingerprint pieces is included in the noise region, a command for re-selecting fingerprint pieces may be output to the AI (or the singular point determiner 160 shown in FIG. 3) (S140). This process may be repeated until the fingerprint pieces are not included in the noise region.

When the fingerprint pieces are not included in the noise region, a singular point may be determined by using the fingerprint pieces (S200) as a subsequent process.

As described above, in the fingerprint authentication device, the display device including the same, and the method of authenticating a fingerprint thereof in accordance with embodiments of the present disclosure, an interest region having a small area, which includes a large number of minutiae, may be rapidly extracted by using the AI technique operated in parallel with the existing image processing. Accordingly, the reliability of authentication of biometric information sensed through a large-area fingerprint sensing region, and a processing speed for authentication, may be increased.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to the embodiments thereof, it will be understood by those of ordinary skill in the art that various changes in form and detail may be made therein without departing from the spirit and scope of the present disclosure as defined by the following claims.

What is claimed is:

1. A fingerprint authentication device, comprising:
a biometric sensor configured to generate a sensing signal by sensing biometric information;
an image processor configured to generate a fingerprint image based on the sensing signal;
a singular point determiner circuit configured to select at least one fingerprint piece based on the fingerprint image or the sensing signal, and determine a singular point of the fingerprint image by analyzing the selected at least one fingerprint piece,
wherein the image processor is further configured to:
extract an interest region including the singular point from the fingerprint image based on a coordinate of the singular point;
convert the sensing signal into a first fingerprint image in a digital form, which corresponds to the fingerprint image;
detect a noise region influenced by noise caused by an external environment in the first fingerprint image, and generate a second fingerprint image by blurring the noise region; and
determine the interest region having a predetermined size, which includes the singular point, in the second fingerprint image, and discard a remaining portion of the second fingerprint image other than the interest region; and
an authenticator circuit configured to perform fingerprint authentication by comparing the interest region with registered fingerprint information.

2. The fingerprint authentication device of claim 1, wherein the singular point determiner circuit is configured to determine the singular point through machine learning using a detection model set by the singular point determiner circuit.

3. The fingerprint authentication device of claim 2, wherein the singular point determiner circuit is configured to divide the fingerprint image into k sampling regions, wherein k is an integer greater than 1, and select fingerprint pieces corresponding to an arbitrary position of each of the k sampling regions.

4. The fingerprint authentication device of claim 3, wherein the singular point determiner circuit is configured to acquire the singular point by applying, to the detection model, ridges and valleys, which are derived from each of the fingerprint pieces.

5. The fingerprint authentication device of claim 2, wherein the singular point determiner circuit is configured to set the detection model based on model fingerprint images used for machine learning, and the model fingerprint images are provided from outside of the fingerprint authentication device.

6. The fingerprint authentication device of claim 5, wherein the singular point determiner circuit is configured to update the detection model through additional machine learning using the fingerprint image generated by the image processor, the at least one fingerprint piece of the fingerprint image, and the interest region.

7. The fingerprint authentication device of claim 2, wherein the image processor further comprises:
- a first data processor configured to convert the sensing signal into the first fingerprint image;
- a second data processor configured to detect the noise region and generate the second fingerprint image by blurring the noise region;
- an image cropper circuit configured to determine the interest region having the predetermined size, and discard the remaining portion of the second fingerprint image other than the interest region; and
- a storage configured to store information of the interest region.

8. The fingerprint authentication device of claim 7, wherein the image cropper circuit is configured to determine the coordinate of the singular point as a center coordinate of the interest region.

9. The fingerprint authentication device of claim 7, wherein the image cropper circuit is configured to shift a center coordinate of the interest region such that the interest region becomes more distant from the noise region.

10. The fingerprint authentication device of claim 9, wherein the center coordinate is located more distant from the noise region than the coordinate of the singular point.

11. The fingerprint authentication device of claim 7, wherein the second data processor is configured to:
- digitize the noise; and
- generate a fingerprint sensing retry command when the noise is equal to at least a predetermined threshold reference value.

12. The fingerprint authentication device of claim 7, wherein the noise region is a portion of the first fingerprint image having a luminance greater than a predetermined luminance tolerance.

13. The fingerprint authentication device of claim 7, wherein the noise region includes at least one of a portion at which a wrinkle except a fingerprint is expressed, a portion which is relatively dry, and a portion overlapping a foreign matter.

14. The fingerprint authentication device of claim 2, wherein an area of a sensing region of the biometric sensor is greater than an area of the interest region.

15. The fingerprint authentication device of claim 14, wherein the area of the interest region is equal to or less than about 30% of the sensing region.

16. The fingerprint authentication device of claim 2, wherein the singular point includes at least one of a core and a delta of a fingerprint.

17. A method of authenticating a fingerprint of a display device, the method comprising:
generating a fingerprint image of a fingerprint sensed through a biometric sensor;
determining a singular point of the fingerprint image through machine learning by selecting a plurality of fingerprint pieces from the fingerprint image;
extracting an interest region including the singular point from the fingerprint image; and
authenticating a fingerprint by comparing the interest region with registered fingerprint information,
wherein generating the fingerprint image comprises:
determining a noise region by analyzing data of the fingerprint image; and
generating a corrected fingerprint image by blurring the noise region,
wherein extracting the interest region comprises:
determining the interest region including the singular point in the corrected fingerprint image; and
discarding a remaining portion outside of the interest region.

18. The method of claim 17, wherein determining the singular point comprises:
setting a preliminary detection model for detecting the singular point through machine learning based on a model fingerprint image used for machine learning, which is provided from outside of the display device;
selecting the fingerprint pieces from an arbitrary position of the model fingerprint image used for machine learning, and restoring the model fingerprint image used for machine learning by using the fingerprint pieces and the preliminary detection model;
updating the preliminary detection model as a detection model by machine-learning the restored model fingerprint image used for machine learning; and
calculating the singular point from a real-time fingerprint image by using the detection model.

19. The method of claim 18, wherein determining the singular point further comprises:
updating the detection model by machine-learning the real-time fingerprint image and the singular point of the real-time fingerprint image.

20. The method of claim 17, wherein determining the interest region comprises:
comparing positions of the interest region and the noise region;
determining a coordinate of the singular point as a center coordinate of the interest region, when the interest region and the noise region do not overlap each other; and
shifting the center coordinate of the interest region such that the interest region becomes more distant from the noise region, when at least a portion of the interest region overlaps the noise region.

21. The method of claim 17, wherein generating the fingerprint image further comprises:
comparing positions of the fingerprint pieces and the noise region; and
outputting a command for re-selecting the fingerprint pieces, when at least one of the fingerprint pieces is included in the noise region.

22. A display device, comprising:
a display panel including a plurality of pixels; and
a fingerprint authentication device configured to sense a fingerprint input via the display panel,
wherein the fingerprint authentication device comprises:
a biometric sensor disposed on one surface of the display panel and configured to generate a sensing signal by sensing the fingerprint;

an image processor configured to generate a fingerprint image based on the sensing signal;

a singular point determiner circuit configured to select a plurality of fingerprint pieces from the fingerprint image, and determine a singular point of the fingerprint image by analyzing the selected fingerprint pieces, wherein the image processor is further configured to:

extract an interest region including the singular point from the fingerprint image based on a coordinate of the singular point;

convert the sensing signal into a first fingerprint image in a digital form, which corresponds to the fingerprint image;

detect a noise region influenced by noise caused by an external environment in the first fingerprint image, and generate a second fingerprint image by blurring the noise region; and determine the interest region having a predetermined size, which includes the singular point, in the second fingerprint image, and discard a remaining portion of the second fingerprint image other than the interest region; and an authenticator circuit configured to perform fingerprint authentication by comparing the interest region with registered fingerprint information.

\* \* \* \* \*